United States Patent
Maximov et al.

(10) Patent No.: US 11,323,259 B2
(45) Date of Patent: May 3, 2022

(54) VERSION CONTROL FOR TRUSTED COMPUTING

(71) Applicant: Telefonaktiebolaget LM Ericsson (publ), Stockholm (SE)

(72) Inventors: Alexander Maximov, Lund (SE); Petri Mikael Johansson, Bjärred (SE); Bernard Smeets, Dalby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 440 days.

(21) Appl. No.: 16/333,901

(22) PCT Filed: Sep. 22, 2016

(86) PCT No.: PCT/EP2016/072581
§ 371 (c)(1),
(2) Date: Mar. 15, 2019

(87) PCT Pub. No.: WO2018/054473
PCT Pub. Date: Mar. 29, 2018

(65) Prior Publication Data
US 2019/0207764 A1   Jul. 4, 2019

(51) Int. Cl.
*H04L 29/06* (2006.01)
*H04L 9/32* (2006.01)
(Continued)

(52) U.S. Cl.
CPC ............. *H04L 9/321* (2013.01); *G06F 8/71* (2013.01); *G06F 9/45558* (2013.01);
(Continued)

(58) Field of Classification Search
CPC ..... H04L 9/321; H04L 9/0643; H04L 9/0861; H04L 9/3263; G06F 8/71; G06F 9/45558;
(Continued)

(56) References Cited

U.S. PATENT DOCUMENTS 7,711,960 B2   5/2010 Scarlata
8,843,766 B2 *  9/2014 Schwarz ............... G06F 21/554
                                                           713/190
(Continued)

FOREIGN PATENT DOCUMENTS

WO   2015084144 A1   6/2015

OTHER PUBLICATIONS

Li, Chunxiao et al. A Trusted Virtual Machine in an Untrusted Management Environment. IEEE Transactions on Services Computing, vol. 5, Issue: 4. https://ieeexplore.ieee.org/stamp/stamp.jsp?tp=&arnumber=5928312 (Year: 2011).*

(Continued)

*Primary Examiner* — Jeremiah L Avery
(74) *Attorney, Agent, or Firm* — Christopher & Weisberg, P.A.

(57) ABSTRACT

A method performed by a virtual trusted platform module, vTPM on an execution platform, comprises the steps of obtaining (S11) encrypted information (encvTPMContext) and a first identifier (Salt), both associated with a virtual machine, VM to be executed; retrieving (S14), using the identifier from a trusted launch authority, TLA, at least a first secret portion ($SlaKey_{start}$), the first secret portion ($SlaKey_{start}$) being dynamically linked to the VM and dependant on at least a property of the VM; and decrypting (S16) the encrypted information (encvTPMContext) with a decryption key ($EncKey_{start}$) derived from at least the first secret portion ($SlaKey_{start}$) and a first measurement result ($VmDigest_{start}$) of at least the VM.

22 Claims, 12 Drawing Sheets

(51) Int. Cl.
*G06F 21/57* (2013.01)
*G06F 8/71* (2018.01)
*G06F 9/455* (2018.01)
*G06F 21/60* (2013.01)
*H04L 9/06* (2006.01)
*H04L 9/08* (2006.01)

(52) U.S. Cl.
CPC .......... *G06F 21/575* (2013.01); *G06F 21/602* (2013.01); *H04L 9/0643* (2013.01); *H04L 9/0861* (2013.01); *H04L 9/3263* (2013.01); *G06F 2009/45575* (2013.01); *G06F 2221/033* (2013.01)

(58) Field of Classification Search
CPC ................ G06F 21/575; G06F 21/602; G06F 2009/45575; G06F 2221/033
See application file for complete search history.

(56) References Cited

U.S. PATENT DOCUMENTS

| | | | | |
|---|---|---|---|---|
| 8,909,928 | B2* | 12/2014 | Ahmad | G06F 21/575 713/168 |
| 9,635,013 | B2* | 4/2017 | Koster | G06F 21/44 |
| 2007/0016801 | A1 | 1/2007 | Bade et al. | |
| 2007/0094719 | A1 | 4/2007 | Scarlata | |
| 2009/0172781 | A1* | 7/2009 | Masuoka | H04L 63/105 726/3 |
| 2009/0204964 | A1* | 8/2009 | Foley | G06F 9/45558 718/1 |
| 2010/0281273 | A1* | 11/2010 | Lee | F04B 33/00 713/190 |
| 2011/0213953 | A1 | 9/2011 | Challener et al. | |
| 2014/0189359 | A1 | 7/2014 | Marien et al. | |
| 2014/0281509 | A1 | 9/2014 | Angelo et al. | |
| 2015/0082048 | A1 | 3/2015 | Ferguson et al. | |
| 2015/0178504 | A1* | 6/2015 | Nystrom | G06F 9/45533 713/2 |
| 2015/0319160 | A1* | 11/2015 | Ferguson | G06F 9/45558 726/10 |
| 2015/0358312 | A1* | 12/2015 | Kancharla | H04L 63/0823 713/156 |
| 2016/0259941 | A1 | 9/2016 | Vasudevan et al. | |
| 2018/0004953 | A1* | 1/2018 | Smith, II | G06F 21/78 |
| 2018/0181426 | A1* | 6/2018 | Shi | H04L 63/045 |

OTHER PUBLICATIONS

Mei, Songzhu et al. Trusted Bytecode Virtual Machine Module: Towards Dynamic Remote Attestation in Cloud Computing. 2011 2nd International Symposium on Intelligence Information Processing and Trusted Computing, https://ieeexplore.ieee.org/stamp/stamp.jsp?tp=&arnumber=6103526 (Year: 2011).*

Yu, Zhilou et al. A Cloud Certificate Authority Architecture for Virtual Machines with Trusted Platform Module. 2015 IEEE 17th International Conference on High Performance Computing and Communications. https://ieeexplore.ieee.org/stamp/stamp.jsp?tp=&arnumber=7336360 (Year: 2015).*

Berger, Stefan, et al., "vTPM: Virtualizing the Trusted Platform Module", 15th USENIX Security Symposium, USENIX Association, 2006, 305-320.

* cited by examiner

Fig. 13

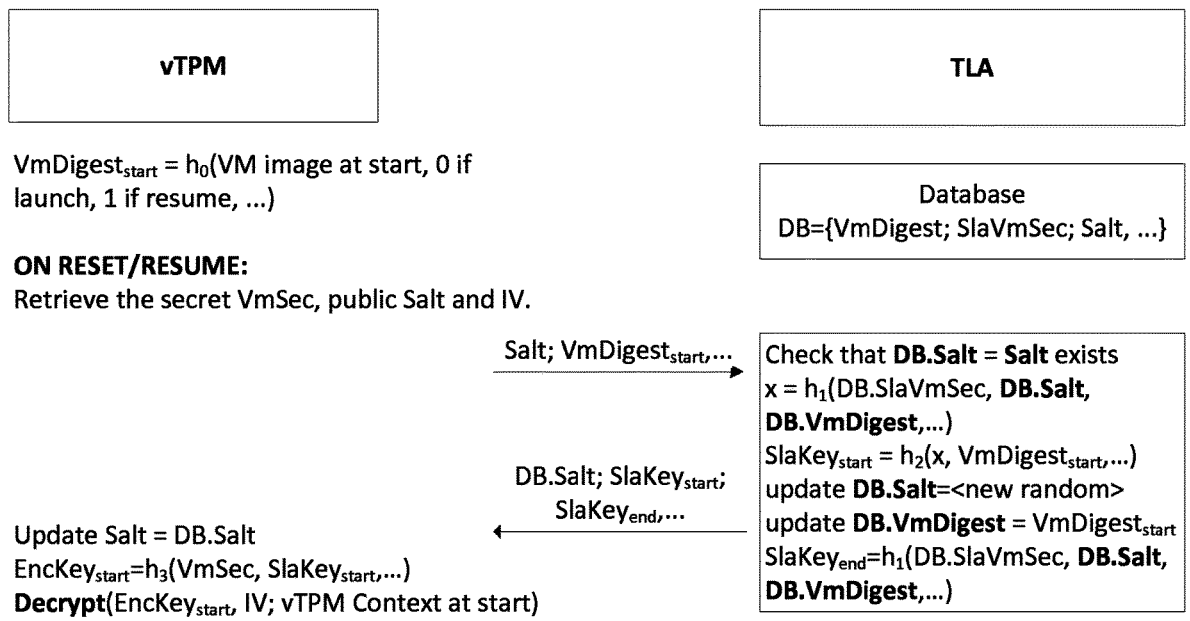

VmDigest$_{start}$ = h$_0$(VM image at start, 0 if launch, 1 if resume, ...)

ON RESET/RESUME:
Retrieve the secret VmSec, public Salt and IV.

→ Salt; VmDigest$_{start}$, ...

Check that DB.Salt = Salt exists
x = h$_1$(DB.SlaVmSec, DB.Salt, DB.VmDigest, ...)
SlaKey$_{start}$ = h$_2$(x, VmDigest$_{start}$, ...)
update DB.Salt=<new random>
update DB.VmDigest = VmDigest$_{start}$
SlaKey$_{end}$=h$_1$(DB.SlaVmSec, DB.Salt, DB.VmDigest, ...)

← DB.Salt; SlaKey$_{start}$; SlaKey$_{end}$, ...

Update Salt = DB.Salt
EncKey$_{start}$=h$_3$(VmSec, SlaKey$_{start}$, ...)
Decrypt(EncKey$_{start}$, IV; vTPM Context at start)

ON SHUTDOWN/SUSPEND:
Generate new random value and update IV
VmDigest$_{stop}$=h$_0$(VM image at stop, 0 if shutdown, 1 if suspend, ...)
EncKey$_{stop}$=h$_3$(VmSec, h$_2$(SlaKey$_{end}$, VmDigest$_{stop}$, ...), ...)
Encrypt(EncKey$_{stop}$, IV; vTPM Context at stop)

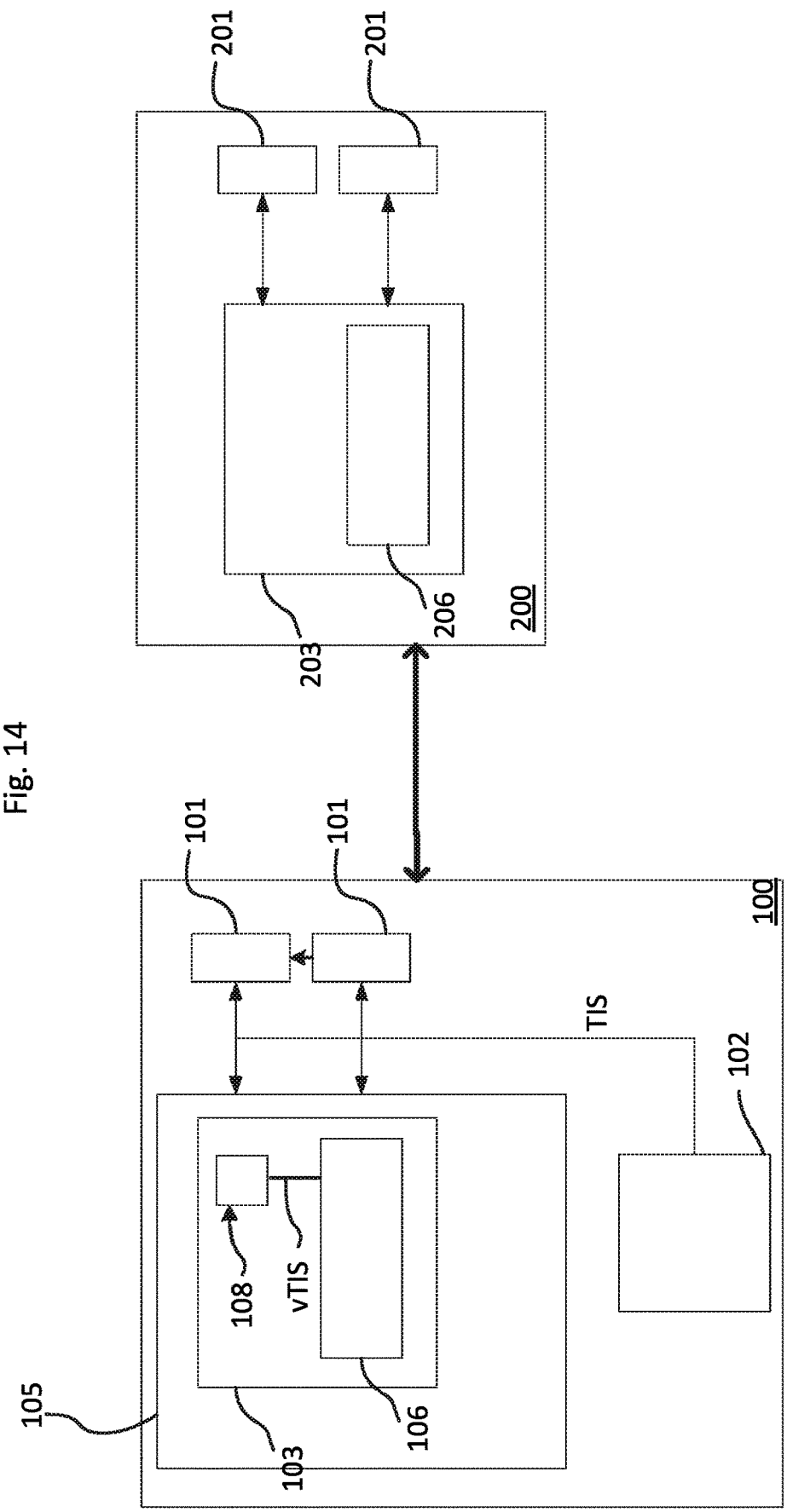

VERSION CONTROL FOR TRUSTED COMPUTING

TECHNICAL FIELD

The present disclosure relates to a method performed by a virtual trusted platform module, vTPM on an execution platform and to a method performed in a trusted launch authority, TLA for supervising an execution of a virtual machine. The disclosure also relates to a network node and an authorization node.

BACKGROUND

The Trusted Computing Group (TCG) has developed a series of specifications that enable to build infrastructures of servers where users and servers can assess if a service/server is trustworthy or not. An important component in the TCG approach is the so-called Trusted Platform Module (TPM), a physical security chip designed to securely store keys and host protective processing capabilities to implement the basic security controls in the server systems. Specifically, the TCG defines servers having so called "Roots of Trust (RoT)" which can be viewed as engines designed for a specific task that, possibly in cooperation with each other, provide immutable security control/functions. The TCG has defined three Roots of Trust, namely the "Root of Trust of Measurement (RTM)", the "Root of Trust of Storage (RTS) ", and the "Root of Trust of Reporting (RTR)". In this view, a TPM is a component that implements a RTS and a RTR while the RTM is typically realized in the host system (the server) where the TPM resides.

Services or applications either on the server or connected to the TPM via a communication channel can utilize the TPM for several purposes. Like already mentioned the TPM can be used in solutions where a system or user wants to assess if another server/service is trustworthy. Towards this end, the TCG has specified a procedure by which a remote entity (user or server) can send an attestation request to a target system that, when equipped with a TPM and properly configured, can send securely attestation data to the remote entity. Furthermore, services can utilize the secure storage functions of the TPM to protect sensitive data such as keys for secured communication. Another important use of the TPM is to assist in implementing secure boot procedures. One such procedure is often referred to as "measured boot" in which the initial (boot) software is verified (measured) and where the measurements are stored securely in the TPM. These measurements can later be used in attestation procedures using the interplay of RTS and RTR of the TPM.

In recent years and in connection with the development of cloud technologies many servers and services run on virtualized processing systems such as, for example, offered by Xen™, KVM™, or VMware™. Consequently, there is also some demand for providing either TPM functionality or special trusted platform modules in such virtual environments, such that user working on a VM can utilize TPM functionality as if he would work directly on a hardware platform.

SUMMARY

The present disclosure addresses these and other aspects related to trusted computing in cloud environments. In particular the present disclosure proposes a version control when dealing with the execution of virtual machines.

In accordance with the present disclosure a method is performed by a virtual trusted platform module, vTPM on an execution platform. The method comprises obtaining encrypted information and a first identifier, both associated with a virtual machine, VM to be executed; retrieving, using the identifier from a trusted launch authority, TLA, at least a first secret portion, the first secret portion being dynamically linked to the VM and dependant on at least a property of the VM; and decrypting the encrypted information with a decryption key derived from at least the first secret portion and a first measurement result of at least the VM.

The proposed method enables encryption and decryption of VM related context with a dynamically changing secret provided by a trusted authority. In accordance with the present invention, the vTPM contacts the TLA during launch or resume procedure of the VM to ensure that only a trusted VM is launched. As the encryption and decryption key changes between snapshots or images of the VM, copied and unauthorized VM are identified and are no longer able to launch. This will significantly increase security when handling cloud solutions and virtual machines in trusted environment.

The property of the version control is achieved by storing the information associated with the VM in an encrypted way where the decryption key derivation depends on the dynamically changing secret provided by the TLA, as well as on properties of the VM and the information or their parts thereof. In this way, during the VM's launch/resume procedures, the vTPM is forced to contact the TLA in order to be able to decrypt the vTPM Context.

The encryption key is dynamically changing and its value is different for different snapshots and/or images of the VM, the TLA keeps track of the history of (at least) the VM's launch/resume events or parts of these events. In this way, there is no possibility to start a copied VM image twice, i.e. to start two copies of one original image.

The VM owner trusting the TLA decides or has agreed to a desired security scenario for vTPM handling. The TLA uses the desired security scenario—that defines the policy how the specific information associated with the VM should be treated. The TLA also serves as the root of trust for the vTPM credentials; there may be generated by or linked to the physical TPM of the host platform and the TLA guarantees by issuing a certificate that the vTPM is trustworthy.

Additionally, the given approach makes it possible to keep track of the vTPM during its lifetime, to control the migration of the any information associated with the VM and to ensure that said information will be exposed only to trusted execution platforms.

In an aspect, a second secret portion is obtained, the second secret portion being associated with a trusted computing base, TCB on the execution platform; and wherein the decryption key is dependant from the second portion. The second secret portion may be obtained from the TLA. This may further increase security.

In another aspect, the encrypted information comprises a unique portion associated with information associated with the VM, wherein the step of decrypting comprises the step of performing an integrity test of the information associated with the VM using the unique portion. Such integrity test supports to identify manipulations on the encrypted information or damages, thereby preventing errors during decryption of an erroneous image, which could cause instable situations.

In another aspect, the method comprises conducting a measurement of at least one of the VM to be executed; and the encrypted information associated with the VM to be executed. For instance, the measurement can be performed by hashing the results. The first measurement result is generated therefrom. In this regard it may be suitable in certain aspects, the TLA is provided with the first measurement result, wherein the first secret portion is dependent on the first measurement result. The first secret portion may also be dependent on at least one of another measurement result stored by the TLA in a database during previous execution of the VM, associated with the first identifier; the first identifier and; a first identifier previously used and stored by the TLA.

As the measurement is unique, the TLA is able to identify the correct secret information from which the decryption key may be derived from.

In another aspect of the present disclosure, the shutdown procedure of a virtual machine is addressed in accordance with the proposal, the method comprises the step of retrieving from the TLA at least a third secret portion, wherein the third secret portion is dynamic and linked to the VM and dependant on at least one of a property of the VM, the first measurement result and a second identifier generated by the TLA. Hence, providing the encryption and decryption key dynamically to the vTPM provides a version control of the respective VM, with which the keys are associated. Encryption of the information associated with the VM and even the image of the VM itself can be performed in response to a shutdown of the VM, a suspension, a snapshot or any other event at which an image file of the VM is generated.

For the encryption purposes, a measurement can be conducted providing a hashed and unique result. The measurement can be performed on one or more of the VMs to be suspended or shutdown, on part of the VM to be suspended or shutdown, properties of the VM to be suspended or shutdown; and information associated with the VM to be suspended or shutdown. The second measurement result is generated therefrom.

In another aspect, the TLA may provide the third secret portion required for the shutdown upon request from the vTPM. Hence, the vTPM request in response to a suspension or shutdown of the VM the at least third secret portion. In an alternative embodiment, the third portion is provided by the TLA together with the first secret portion.

To ensure unique identification and proper version control, the first secret portion and/or the third secret portion may be dependent on one or more of the following elements or data: a measurement result of the VM, a sequential instance of the VM, a start or stop cycle number of the VM, a time stamp at the occurrence of a status change of the VM, information about previous executions of the VM, time information associated with the VM and/or the execution platform and/or the vTPM.

In another aspect during start-up of a VM it is first determined, whether encrypted information exists. If encrypted information does not exist, then the measurement result to the TLA, optionally together with the information; and at least the encrypted information and the identifier associated with the VM to be executed is received from the TLA subsequently.

Alternatively, a secret portion and the identifier associated with the VM to be executed are retrieved from the TLA. Then the information is generated; and encrypted using at least the secret portion to obtain the encrypted information.

In another aspect of the present disclosure, a method is performed by a TLA for supervising an execution of a virtual machine, VM on an execution platform. The method comprises the steps of receiving an identifier associated with a VM to be executed from a virtual trusted platform module, vTPM on the execution platform; and providing to the vTPM, at least a first secret portion of a secret being derived from the identifier, the first secret portion being dynamic and linked to the VM to be executed.

Due to the dynamic linking, which is dependent on the status of the VM associated with, the TLA supervises the execution of a VM on the execution platform. The TLA uses a pre-aligned security scenario that defines the policy how the specific information associated with the VM should be treated. In response to request by the virtual TPM on the execution platform, the TLA also serves as the root of trust for the vTPM credentials; there may be generated by the physical TPM of the host platform and the TLA guarantees by issuing a certificate that the vTPM is trustworthy.

Additionally, the given approach makes it possible to keep track of the vTPM during its lifetime, to control the migration of the information associated with the VM and to ensure that said information will be exposed only to trusted execution platform.

In an aspect, the TLA receives from the vTPM a measurement result associated with the VM to be executed. When the TLA generates the first secret portion, the first secret portion may be dependent on at least one of the measurement result, another measurement result stored by the TLA in a database during previous execution of the VM, associated with the first identifier, the first identifier and a first identifier previously used and stored by the TLA. The TLA may provide a database, which is updated with the measurement result.

To increase security, the TLA may in an aspect of the disclosure obtain a second secret portion from a physical trusted platform module on the execution platform; and generate the at least first secret portion of a secret dependant on the second secret portion.

In another aspect, the TLA may perform certain additional task when providing the first secret portion. The TLA may generate a new identifier with random content, provide a third secret portion of the secret, the third secret portion dependant on the new identifier and at least one of a property of the VM, the measurement result; and a secret associated with at least one of the TLA and the VM. The third secret portion is therefore dynamically generated and can be used by the vTPM to encrypt information associated with the VM and/or parts of the VM itself.

In some aspect, the TLA may generate encrypted information associated with the VM in response to a request by the vTPM. The encrypted information can be dependent at least on a measurement result provided by the vTPM and an identifier associated with the VM and generated by the TLA. Such encrypted information is then provided to the vTPM. In addition, a secret may be generated, where the secret is associated with the VM to be executed. The secret is provided to the vTPM in a secured way, and optionally in a way different from providing to the vTPM at least the first secret portion. The secured communication prevents eavesdropping or other attacks against the VM or its trusted execution.

In another aspect, a network node comprises a memory, one or more processors and a physical trusted platform module pTPM. The one or more processors are configured to execute a virtual machine, VM on the node. The one or more processors are also configured to obtain encrypted information and a first identifier, both associated with a virtual machine, VM to be executed. The one or more processors are further configured to retrieve, using the identifier from a trusted launch authority, TLA, at least a first secret portion; the first secret portion dynamic and linked to the VM and dependant on at least a property of the VM. The one or more processors are further configured to decrypt the obtained encrypted information with a decryption key derived from at least the first secret portion and a first measurement result of at least the VM.

In an aspect, the one or more processors are configured to execute a virtual trusted platform module vTPM. In a further aspect the one or more processors are configured to obtain a second secret portion, the second secret portion associated with the physical trusted platform module, wherein the decryption key is dependent on the second portion. In an alternative aspect, the one or more processors are configured to obtain a second secret portion from the TLA via a network, wherein the decryption key is dependent on the second secret portion.

In some other aspects of the disclosure, the one or more processors are configured to conduct a measurement of at least one of the VM to be executed and the encrypted information associated with the VM to be executed. The first measurement result is generated therefrom, whereby the measurement may be obtained by hashing the respective data and/or information.

In another aspect of the node, the one or more processors are configured to provide the TLA with the first measurement result to retrieve the first secret portion, wherein the first secret portion is dependent on the first measurement result. The first secret portion may also be dependent on another measurement result stored by the TLA in a database during previous execution of the VM, associated with the first identifier, the first identifier and; a first identifier previously used and stored by the TLA. In other words, the node is configured to communicate with the TLA to obtain first secret portion.

It may be suitable to consider also shutdown or suspension procedure of the VM. Accordingly in one or more aspects, the one or more processors are configured to retrieve from the TLA at least a third secret portion. The third secret portion is dynamic and linked to the VM and dependant on at least one of a property of the VM, the first measurement result and a second identifier generated by the TLA.

The third secret portion can be used to dynamically encrypt information associated with the VM to be shutdown, suspended or otherwise stooped. Accordingly, the one or more processors may be configured to encrypt information in response to a suspension or shutdown of the VM with an encryption key derived from at least the third secret portion and a second measurement result of at least the VM.

For further support this aspect, the one or more processors are configured to conduct a measurement, for instance hashing at least one of the VM to be suspended or shutdown, part of the VM to be suspended or shutdown, properties of the VM to be suspended or shutdown and information (encvTPMContext) associated with the VM to be suspended or shutdown. The measurement result is generated therefrom.

The third secret portion may be requested from the TLA for encrypting the information. As discussed previously the first secret portion and/or the third secret portion may be dependent from a measurement result of the VM, a sequential instance of the VM, a start or stop cycle number of the VM, a time stamp at the occurrence of a status change of the VM, information about previous executions of the VM, time information associated with the VM and/or the execution platform and/or the vTPM or any combination of the above.

Another aspect is related to the first or initial execution of the VM. In such case all relevant resources have to be made aware of the new initial launch in order to initialize the version control. Consequently, the one or more processors are configured to determine whether encrypted information exists. If such encrypted information does not exist, the one or more processors send a measurement result to the TLA; and retrieve from the TLA at least the encrypted information and a second identifier associated with the VM to be executed. Further optionally, a secret associated with the VM to be executed and generated by the TLA may be received. In an alternative aspect, the secret portion and the second identifier associated with the VM to be executed may be retrieved from the TLA. The one or more processors may then generate the information themselves; and encrypt the information to obtain the encrypted information using at least the secret portion from the TLA.

Yet another aspect is related to an authorization node comprising a memory, one or more processors and a trusted launch Authority, TLA executed by the one or more processors for supervising at least partly an execution of a virtual machine, VM on an execution platform. The one or more processors are configured to receive from a virtual trusted platform module, vTPM on the execution platform an identifier associated with a VM to be executed and to provide to the vTPM, at least a first secret portion of a secret in response to the identifier, the first secret portion dynamic and linked to the VM to be executed and dependant on at least a property of the VM.

The authentication node may receive from the vTPM, a measurement result associated with the VM to be executed, wherein the first secret portion is dependent on the measurement result. As the authentication node serves as afoot of trust in this regard, it may comprise a database containing all required information for supervising a trusted environment. Consequently the one or more processors of the authentication node may update a database of the TLA with the measurement result.

To further improve the security the TLA may communicate with a physical trusted platform module of the execution platform, which is the platform executing the VM. This may ensure that the VM can only launched on platforms, which are trusted by the TLA. In an aspect, the one or more processors of the authentication platform are configured to obtain a second portion of the secret from a physical trusted platform module on the execution platform; and generate the at least first secret portion of a secret dependant on the second portion. The one or more processor are further configured to generate a secret associated with the VM to be executed and to provide the secret to the vTPM in a way different from providing to the vTPM, at least the first secret portion.

In some instances, the one or more processors of the authentication platform are configured to generate randomly a new identifier and to provide a third secret portion of the secret. This third secret may be used for shutdown or suspension of the executed VM. The third secret portion can be dependent on the new identifier and at least one of a property of the VM, the measurement result and a secret associated with the TLA and the VM.

In yet another aspect the authentication node may be configured to generate encrypted information associated with the VM in response to a request by the vTPM, the encrypted information dependant at least on a measurement result provided by the vTPM and an identifier associated with the VM and generated by the TLA. The encrypted information is then provided to the vTPM.

BRIEF DESCRIPTION OF THE DRAWINGS

In the following, the present disclosure will be described in detail in connection with several embodiments and with reference to the drawings, in which:

FIG. 13 illustrates an implementation example for a communication between a vTPM and a TLA including several aspects for the present disclosure;

FIG. 14 shows a host platform and an authorization platform in accordance with some aspects of the present disclosure.

DETAILED DESCRIPTION

For the purpose of the present disclosure, a virtual machine (VM) is an emulation of a given computer system. Virtual machines operate based on the computer architecture and functions of a real or hypothetical computer and their implementations may involve specialized hardware, software, or a combination thereof.

There are different kinds of virtual machines, each with different functions. System virtual machines (also termed full virtualization VMs) provide a complete substitute for the targeted real machine and a level of function needed to execute a full operating system.

The VM itself is executed by a virtualization platform on a so called host system. Said host system is a real computer platform comprising one or more processors, memory, storage, input/output devices and other hardware elements. Various computers capable of executing one or more VM exist and are readily available. The computer platform can be connected to a network enabling a user to access the platform itself and the virtual machine executed thereon via the virtualization platform. In such case the computer platform is called node.

A virtualization platform may be a hypervisor that uses native execution to share and manage hardware, allowing multiple different environments, isolated from each other, to be executed on the same physical machine. Modern hypervisors use hardware-assisted virtualization, which provides efficient and full virtualization by using virtualization-specific hardware capabilities, primarily from the host processors.

Some virtualization platforms, such as KVM/QEMU, are designed to also emulate different architectures and allow execution of software applications and operating systems written for another CPU or architecture. Operating-system-level virtualization allows the resources of a computer to be partitioned via the kernel's support for multiple isolated user space instances, which are usually called containers and may look and feel like real machines to the end users.

Figure 1:
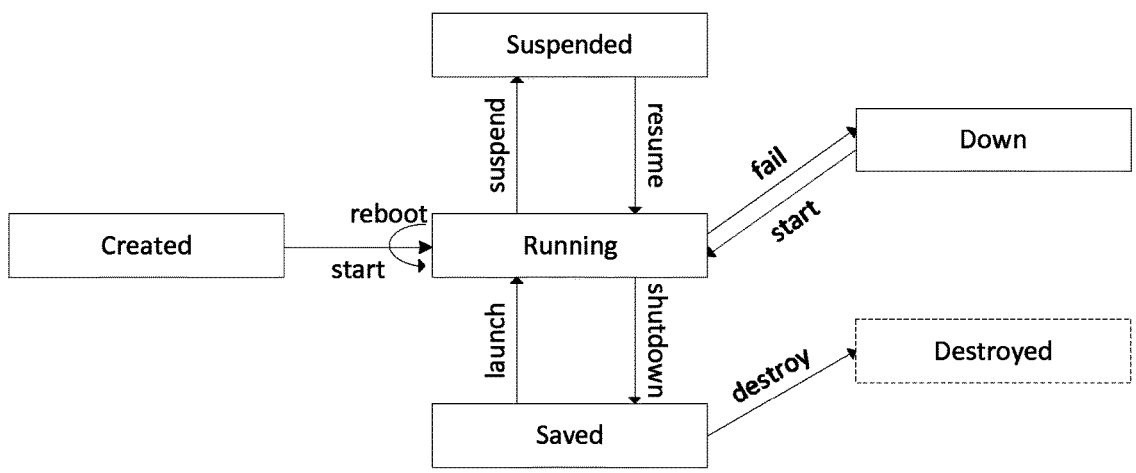
FIG. 1 illustrates a state machine for a virtual machine, VM.

The life cycle of a virtual machine, VM can be visualized by its state machines, illustrating the different operating states and the transition between those operating states. FIG. 1 shows such a state machine for a VM.

A VM is usually created from a template, i.e. using a copy of a previously saved VM where an operating system, OS has been installed with a setup that may be generic or been configured for a specific purpose. A VM may also be created from scratch, e.g. attach an ISO file and install the OS from the virtualized CD/DVD-ROM.

Once running, the state of the VM may come into one of the following states:

Saved; a gracefully shutdown of the operating system, where all running applications has been terminated.

Suspended; the VM is stopped and then the entire current state of the VM is saved, which later can be resumed in the exact same state when it was stopped.

Down; a running VM may have failed due to e.g. a HW issue or it has been ungracefully shutdown.

When the VM is shutdown, a new image of the VM is saved to be launched at a later stage. This cycle we call for shutdown/launch. The image of the VM itself may be a simple file containing all information. After a normal shutdown or even suspension the saved image can be moved or copied. For instance, an image of a shutdown VM can be copied and then relaunched on a plurality of different virtualization platform or on the same virtualization platform a couple of times. Such procedures may be allowed or prohibited depending on security policies and enforcement mechanisms implemented.

When a VM is migrated or the operator takes a snapshot then the VM is suspended at the source location, and then resumed at the destination location. This cycle we call for suspend/resume procedures. Of course the suspend/resume cycle may also occur on the same machine. Through the above definition of suspend/resume, this part of the lifetime cycle includes migration of the VM as well. Any state, in which at the end the VM is executed and active in the sense that a user can access the VM is referred to as a VM to be executed. In other words a VM to be executed refers to a VM to be launched, to be resumed or to be migrated or otherwise started.

If a VM stems from systems that originally used trusted platform module, TPM functions one has to the option to introduce a virtual TPM (vTPM) that is associated with its VM. This option becomes increasingly important as users expect to work under a VM as if they would work with real existing hardware. Hence, there is a growing need to have efficient vTPM solutions that fulfil the functional needs and security demands of VMs and the applications/services implemented therein.

The technical and security challenges of realizing vTPM solutions have been the subject of various research work, see for instance in S. Berger et al., "vTPM: Virtualizing the trusted platform module," in USENIX Security, pp. 305-

320, 2006, which is incorporated herein by reference in its entirety addressing some, but not all of potential issues involved.

One aspect involved is the related to the virtualization of a trusted computing base vTCB, as users may require a system and an operation that can be trusted. As VM is by nature a virtual environment, one needs to establish a respective vTCB preventing a third party from tampering the environment, by executing for instance a VM on a non-trusted platform. Likewise, there is a need to confirm that a VM has booted in a trusted state so it can be considered as trusted base.

In some existing solution, the owner of the VM does not have any control over the security of the vTPM, and has to trust to the execution platform owner that the execution platform is operating in a trustworthy way, and that e.g. the hypervisor is intact. Also, the VM owner must trust the cloud manager so that the VM will not be migrated to an untrusted entity. Likewise a user has to trust the VM on which he works on is in a non-broken or non-hacked state.

Such state can be questionable, as in prior art solution the VM image can be copied and then launched later to reproduce the same behavior of the VM. For example, an attacker tries to find a password to some service that is executed by the VM, and after 3 fails the service blocks the attacker's username. However, one may copy the VM image and then repeat the attack as many times as needed to challenge the service. The same attack scenario would apply to a vTPM; where a blocked vTPM could be unblocked by simply launching a saved copy.

In another setup, there could be other security requirements that state that only one and only the latest copy of the VM is allowed to be executed at any given time.

In order to prevent such an attack scenario and ensure the right version of a VM is executed once at any time, there must be an external entity that can control the version of the launched VM, which means that the control should be initiated at the manufacturing step, from the time when the VM is launched for the first time. In a similar manner, there is a need to secure the version of the vTPM to be launched.

For the purpose of illustrating the various aspects of the present disclosure in light of the embodiments, the following terms are used throughout this disclosure:

vTPMContext

The information that is or will be associated with the VM is referred to as vTPMContext. The vTPMContext includes the TPM's internal secrets, such as the Endorsement Key or primary seeds, content of the NV storage, and other secret and non-secret values.

In case, the vTPM is mapped to the physical TPM, the context stays inside of the chip and no extra handling is needed.

On the other hand, if a vTPM solution utilizes a TPM emulator implemented in software, then the vTPMContext must be stored somewhere (e.g., as a file on HDD, Flash memory, etc.) when the vTPM is suspended, and must be reloaded when vTPM is started again.

VmDigest

VmDigest is the measurements of the VM itself and the vTPMContext. In a simple case, the VmDigest can be computed as a hash of the VM image and the vTPMContext.

However, it is not necessary to hash the whole image of the VM, but the way how the digest is computed must be efficient enough to distinguish between two snapshots of the same or different VMs. For example, the VmDigest may include the vTPMContext, the CPU state of the VM, the RAM of the VM, a virtual BIOS, and also, the FAT of the VM's HDD, etc.

vTPM and vTPM Device

Figure 2:
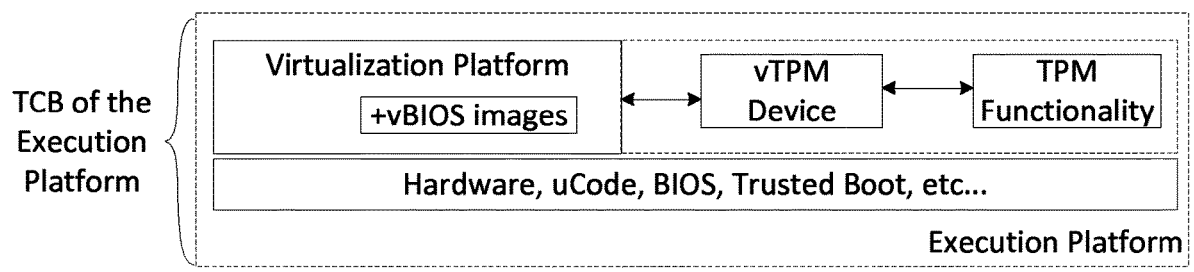
FIG. 2 shows an embodiment of a trusted computing base configured to execute one or more virtual machines.

FIG. 2 shows an embodiment of such a TCB of an execution platform configured to execute one or more VM. The TCB of the execution platform comprises the platform specific component, like Hardware, BIOS or OS and has performed a trusted boot itself. The Operating systems has executed the virtualization platform, which comprises one or more virtual BIOS images, vBIOS that represents the virtual hardware base of the virtualization platform. The execution platform also comprises a virtual TPM Device, vTPM Device interacting with the virtualization platform and providing access to TPM functionality. In some embodiments the vTPM Device can be part of the virtualization platform, like in hypervisor solution, in which it is part of the solution. In case of KVM/QEMU platforms it may be a separate vTPM Device, similar to virtual USB devices, or virtual Network cards.

The vTPM Device is the execution engine that supports the TPM functionality for the VM (not illustrated in FIG. 2). The vTPM Device may integrate a TPM emulator and pass TPM commands from the VM to the emulator. The vTPM Device may use any type of channel to communicate with a TPM emulator or even a physical TPM of the execution platform, and by this way vTPM Device supports the TPM functionality for the VM. In some operation and/or instances the vTPM Device may act as a proxy providing functionality by passing the respective requests and commands to the underlying pTPM.

The vTPM also supports the virtualization platform with the VM's lifecycle procedures related to the vTPMContext, such as: shutdown/launch and suspend/resume cycles. On the launch/resume procedures the vTPM may resolve different situations that may happen on the execution platform in regards to the vTPMContext, such as:

The vTPMContext is not found and there is a need to manufacture a new vTPMContext or to restore the vTPMContext if it exists but the secrets were lost or unavailable.

Decrypt the vTPMContext during the launch/resume procedures so that the vTPM becomes operational for the VM, and encrypt the vTPMContext when the VM is shutdown or suspended.

Others such as, for example, vTPM may as well have an opened listening port and respond to external requests about the status of the vTPMContext, etc.

As such it is possible to use the vTPM with its TPM functionality for several VMs. The VM may communicate with the vTPM Device via an interface according to TPM Interface Specification, via a low level FIFO hardware interface specified by TCG for communication with a TPM or the newer Command Response Buffer (CRB) interface, or any other appropriate interface. The simulation of the TIS interface may be done by the virtualization platform, such as KVM/QEMU. However, there could be other means and channels how the VM and the vTPM Device establish a communication channel. The overall vTPM therefore comprises the vTPM Device, the TPM functionality, any virtual storage associated with the vTPM and all necessary communication channels and interfaces.

Trusted Launch Authority, TLA

The TLA as for instance illustrated in FIG. 14 is an entity supervising and controlling certain steps of the VM's lifecycle and also to assist the vTPM to resolve different situations. TLA may help the vTPM to manufacture a new vTPMContext, to issue a vTPM's certificate, to support with launching/resuming of the VM, to assist with the migration, etc.

Depending on the implementation choices and external parameters given to the virtualization platform to launch the VM, the vTPM discovers the location of the TLA and connects to it.

The TLA may reside remotely and can be accessed through, e.g., TCP/IP, and use, for example, a TLS/SSL secure channel. In this case, the discovery of the TLA may be as simple as providing the virtualization platform with an IP address and the port number as the VM's startup parameters. The TLA may as well reside on the local network, on the execution platform itself as a separate thread or a process, or be integrated in the virtualization software, etc.

The TLA may be implemented as a single entity or be distributed into several components. Functionality of the TLA may involve third parties, for example, the TLA may rely on an external identification service provided by a network operator. For simplicity, we consider the TLA as a single entity. I.e., we consider that in all situations where vTPM would require a third party, the vTPM would then contact the TLA—a collection of services and entities other than vTPM itself.

Secure Connection

In some situation as explained below, the vTPM may connect to the TLA requesting or transmitting data. Such communication is achieved by establishing a trusted and secured communication channel between the vTPM and the TLA as shown in FIG. 14. The channel may be done via TCP/IP, or be a shared buffer, or can use the operating system's capability to send signals, by using proxy points, or by other means. When the physical channel is established, the trusted connection may involve other protocols and procedures to establish a trust between the two parties. The trusted connection may involve a TLS/SSL connection, exchange of certificates, can be based on the use of TPM keys on one or both sides, may involve a remote attestation of one or both connection ends, or other methods.

Salt, IV

In cryptography, random data that is used as an additional input to a one-way function, which often referred to as hash function to "hash" a password or passphrase. Such random data is Salt, which in the way used as described in this disclosure and is also shared between the vTPM and the TLA. A new salt value is dynamically random or pseudo-random. This serves two purposes—as an identifier of the VM and also to prevent replay attacks in certain scenarios.

The initialization vector for the hash function or IV is also a public value, but only needed at the vTPM side when encrypting/decrypting. This value is a dynamic random, generated by vTPM and stored somewhere (e.g., attached to the encrypted blob, stored in an associated ticket file, etc.). When (and if) TLA manufactures a new vTPMContext as explained below and encrypts it then it will be TLA who at the first (and the last) time generates a new IV, and store it in the appropriate (decided) way.

Figure 3:
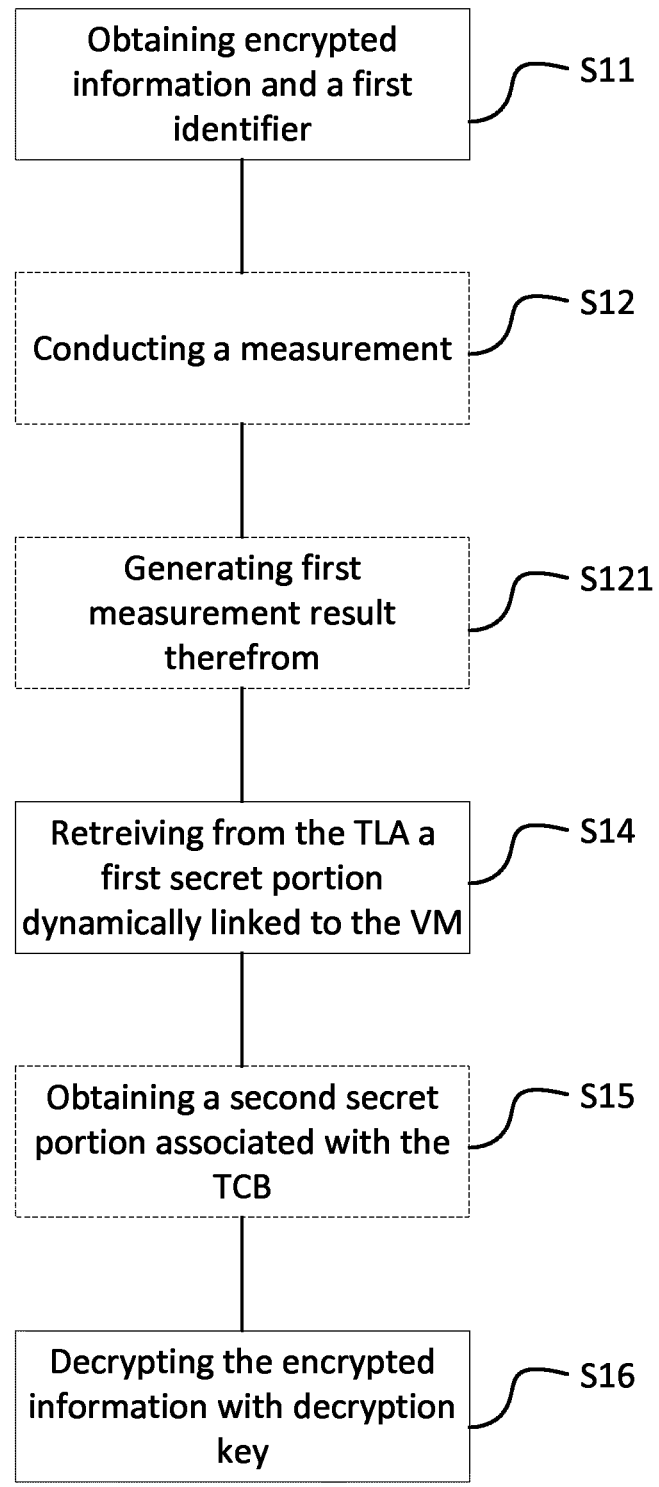
FIG. 3 shows a first embodiment of a method illustrating several aspects of the present disclosure.

FIG. 3 illustrate a first embodiment a method performed by a vTPM of an execution platform supporting the lunch of a VM in accordance with the proposed principle. In step S11 the vTPM obtains encrypted information, the encrypted vTPMContext, encvTPMContext as well as a first identifier, called Salt. Both are associated with the VM to be executed. In a subsequent step S14, a first secret portion is obtained from the TLA utilizing the first identifier Salt. This first secret portion $SLAKey_{start}$ is dynamic and linked to the VM, which is identified by the first identifier. Such identification and association enables the trusted launch authority to support and support several VMs and vTPMs. The expression "dynamic and linked" refers to a link between the first secret portion and the VM, which is dependent on the status or a property of the VM. In other words, each time the VM launches or suspends/shutdown, is migrated to another host etc, the property and the status changes and so does the first secret portion. The first secret portion $SLAKey_{start}$ is associated with only one VM an only in a specific status or property. For example, a first secret portion obtained after launch of the VM for the second time will be different from the first portion obtained after the same VM has launch a third time. Hence, the first portion includes some kind of version control.

In step S16, the encrypted information encvTPMContext is decrypted by the vTPM using a decryption key. This key has been generated from the first secret portion $SLAKey_{start}$ and a first measurement result $VMDigest_{start}$ of at least the VM or a portion thereof. In this example, the first secret portion $SLAKey_{start}$ identifies not only the VM, but also the vTPM Context. A manipulated VM or a manipulated first secret portion will therefore result in failure of the decryption process.

As an option, the vTPM may conduct a measurement of the VM to be executed, a portion thereof or the encrypted information encvTPMContext provided by the TLA. The measurement may include hashing with a defined hash function of one or more of the data given above. The hashing will provide a unique result corresponding to $VMDigest_{start}$ as in step S121. In this regard, it is useful to use a portion of the VM, or the encrypted information, which changes or varies rapidly and particular with each launch, snapshot, shutdown and/or suspension if the VM. This may ensure that two snapshot of the VM at different execution times will result in different measurement results $VMDigest_{start}$.

To further ensure security and for instance prevent that the vTPM and VM is executed on a different host or non-trusted platform, the method optionally obtains a second secret portion VmSec in step S15. The second secret portion VmSec is associated with the VM, the vTPM Context and the trusted execution platform or a physical trusted platform module of the execution platform. The decryption key may be dependent from such second secret portion as well.

The main purpose of the associated second secret portion is to bind the vTPMContext to the TCB of the execution platform, so that the context can be available (decrypted) only on trustworthy virtualization platforms.

There could be various different solutions to store and retrieve the VmSec. In one example, the second secret portion VmSec may be sealed to the physical TPM of the execution platform. For example, the VmSec can be unsealed only if a certain set of platform configuration register values are correct, i.e., the execution platform was launched in a trusted state. In an alternative embodiment, VmSec may be encrypted with a key that can be used only inside of the physical TPM and bound to certain set of platform configuration register. That key may be provisioned into the TPM of trusted execution platform in advance, and in this way the VM with the vTPM may seamlessly be migrated between different execution platforms where such a "group" TPM key is provisioned to. VmSec may be a simple password or be accessed by a password.

In a further alternative the second secret portion VmSec is obtained with involvement of a third party. For instance, VmSec may be opened up by a third party (for example, with the help of TLA) that could, for example, perform a remote attestation of the current execution platform before opening VmSec made possible. In yet another scenario, VmSec may be kept by the TLA itself, and be provided or being used by the TLA after a remote attestation of the execution platform succeeded. This way, VmSec can be used only when the execution platform is attested and becomes trusted.

VmSec can be a static secret associated to the vTPM, or be a dynamic secret. In the latter case, the vTPM Device may change the value of the VmSec on the shutdown/suspend cycle and reseal and/or rebind the new VmSec value to the current TCB if it has not been changed since the launch/resume time.

Figure 4:
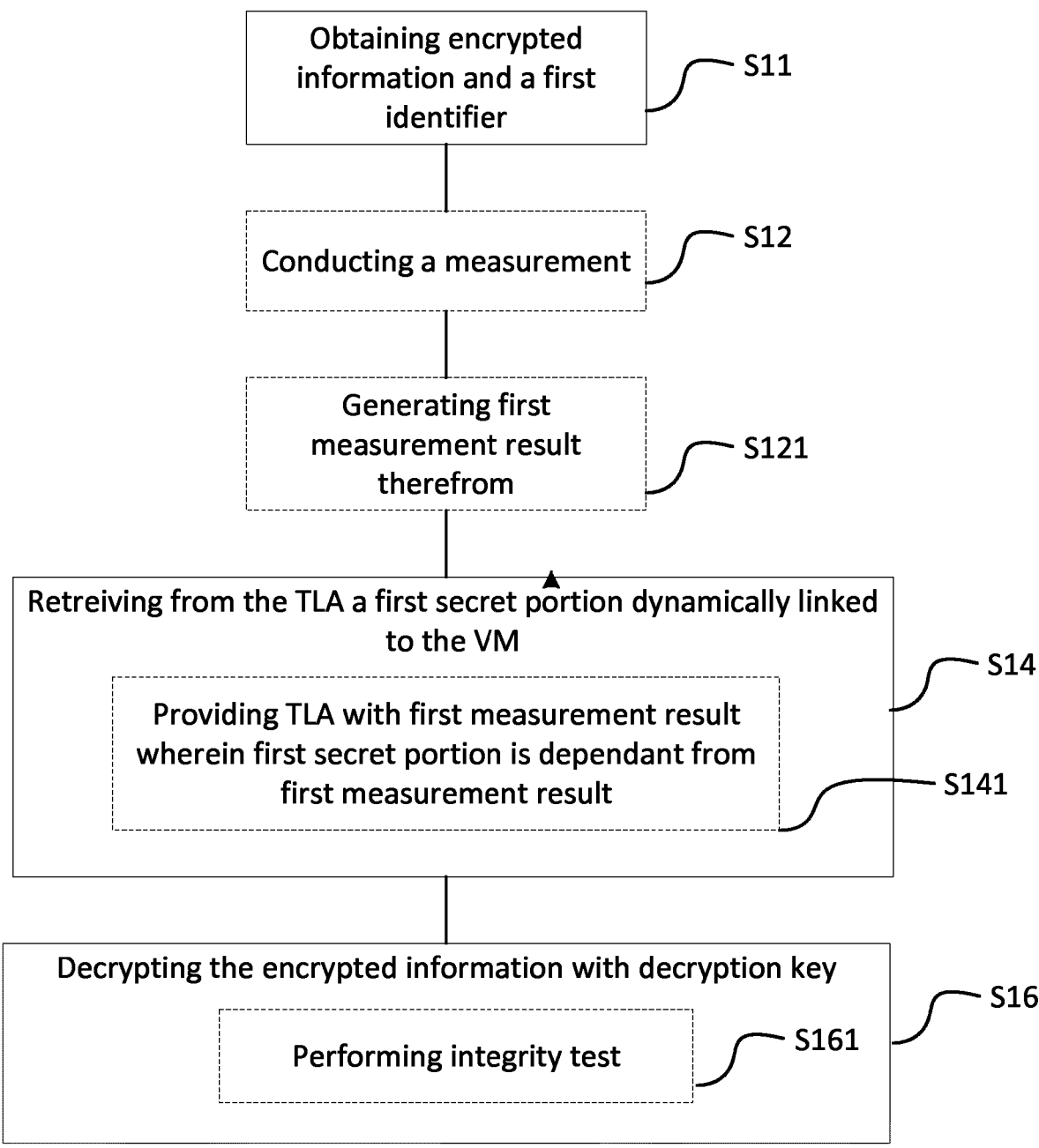
FIG. 4 shows a second embodiment of a method illustrating several aspects of the present disclosure.

FIG. 4 illustrates some further aspects of the present disclosure. Method steps S11, S12 and S121 are similar to the example in FIG. 3. In accordance with the proposed principle, the vTPM requests from the TLA the first secret portion. For this purpose, the vTPM provides first the measurement results $VMDigest_{start}$ besides the first identifier Salt to the TLA. The TLA may use the first measurement result $VMDigest_{start}$ to generate or otherwise obtain the first secret to portion. Hence, the first secret portion is becoming dependent from $VMDigest_{start}$.

In the decrypting step S16, the vTPM may first perform an integrity test on the encrypted file. For example, the encrypted vTPMContext may comprise integrity information, which may be achieved by, e.g., adding a hash of the context to the end/beginning/somewhere of the context blob before encryption. This will further support the trigger when "decryption is failed"; otherwise it becomes unclear how the decryption may fail. If decryption fails vTPM Device can signal the error and perform responsive tasks upon it, for example, it may prevent the VM to be launched.

Figure 5:
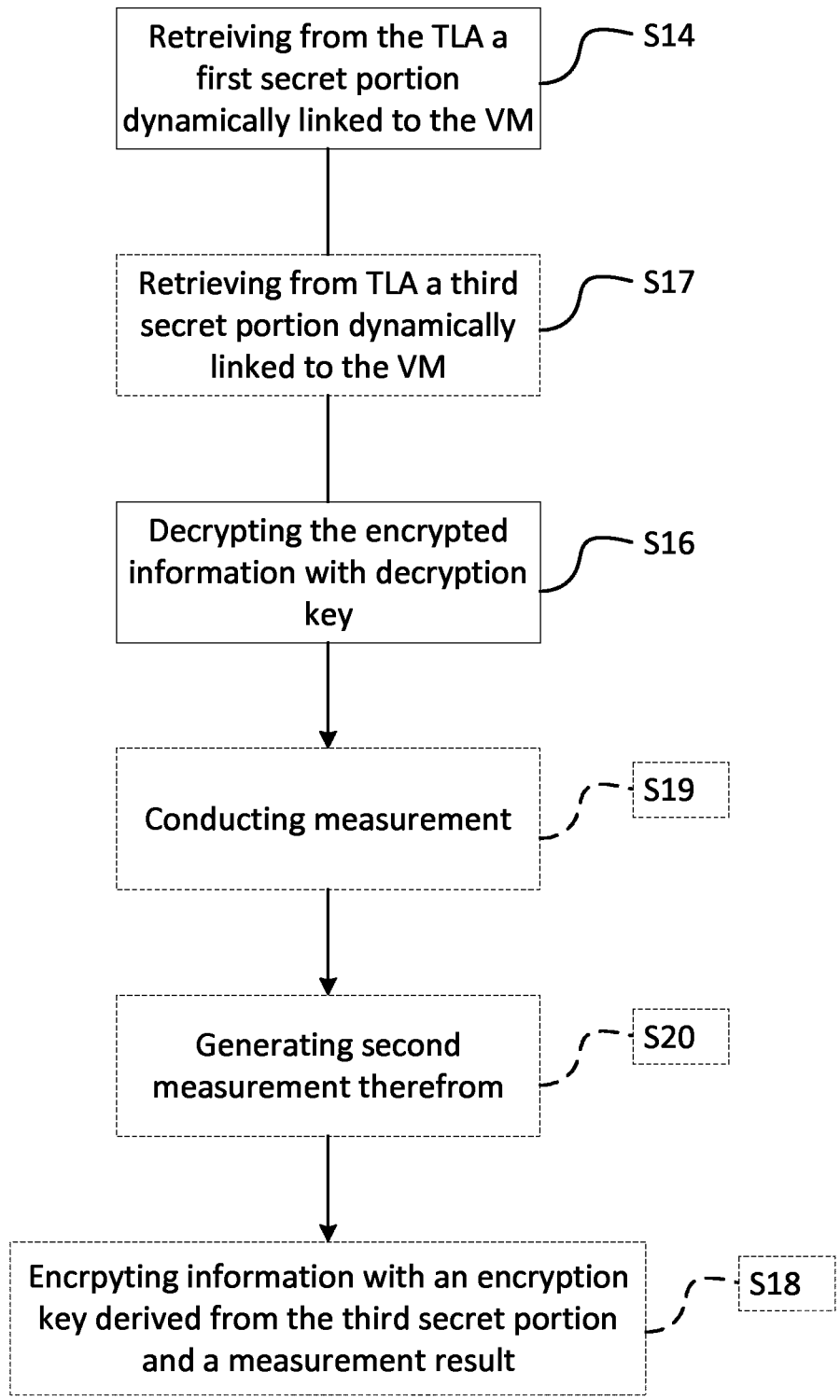
FIG. 5 shows another embodiment of a method illustrating several aspects of the present disclosure.

FIG. 5 illustrates some further aspects of the method in accordance with the proposed principle and related to the shutdown or suspension procedure. To achieve version control, the decrypted vTPMContext has to be re-encrypted taking into account the updated status of the VM. In the presented exemplary method, step S11 is omitted. It can be performed as described in the other examples. The method continues with step S14 as for example described above. The vTPM also requests from the TLA a third secret portion. The third secret portion is dynamic and linked and associated with the VM to the extent that the third secret portion is dependent on the version of the executed VM similar as the first secret portion. The third secret portion may be dependent from a property of the VM, the first measurement result $VMDigest_{start}$ and a second identifier DB.Salt. The latter is generated and provided by the TLA. In particular, the third secret portion may also be dependent on a measurement result of the VM to be suspended or a sequential instance of the VM. It may further be dependent on the start or stop cycle number of the VM, a time stamp at the occurrence of a status change of the VM, information about previous executions of the VM or time information associated with the VM and/or the execution platform and/or the vTPM. One or more of these dependencies support version control of the vTPM.

The encrypted context encvTPMContext is encrypted in step S16 as described above. The execution platform can then use the encrypted information and launch the VM in a trusted state. When a snapshot, shutdown, suspension is triggered, the vTPM will conduct a measurement in step S19 to generate a second measurement result $VMDigest_{end}$ in step S20. The second measurement $VMDigest_{end}$ is related to a property of the VM and unique indicating the status or version. For example vTPM can conduct a measurement of the VM to be suspended, shutdown or otherwise affected by the event. Some parts or portion of the VM, e.g. the file allocation table of the virtual HDD of the VM or other unique and rapidly varying property can be measured. In addition, or alternatively, the vTPMContext associated with the VM can be measured.

When the shutdown commences, the vTPMContext of the associated VM is then encrypted using an encryption key in Step S18 of FIG. 5. Said key is derived from the third secret portion and is optionally dependent from the second measurement result $VMDigest_{end}$. In the exemplary method of FIG. 5, the third secret portion is obtained together with the first secret portion or shortly thereafter. In other words, the TLA provides the third secret portion prior to decrypting the encrypted information encvTPMContext. This has the advantage that the vTPM does not have to contact the TLA after the VM has been launched.

Figure 6:
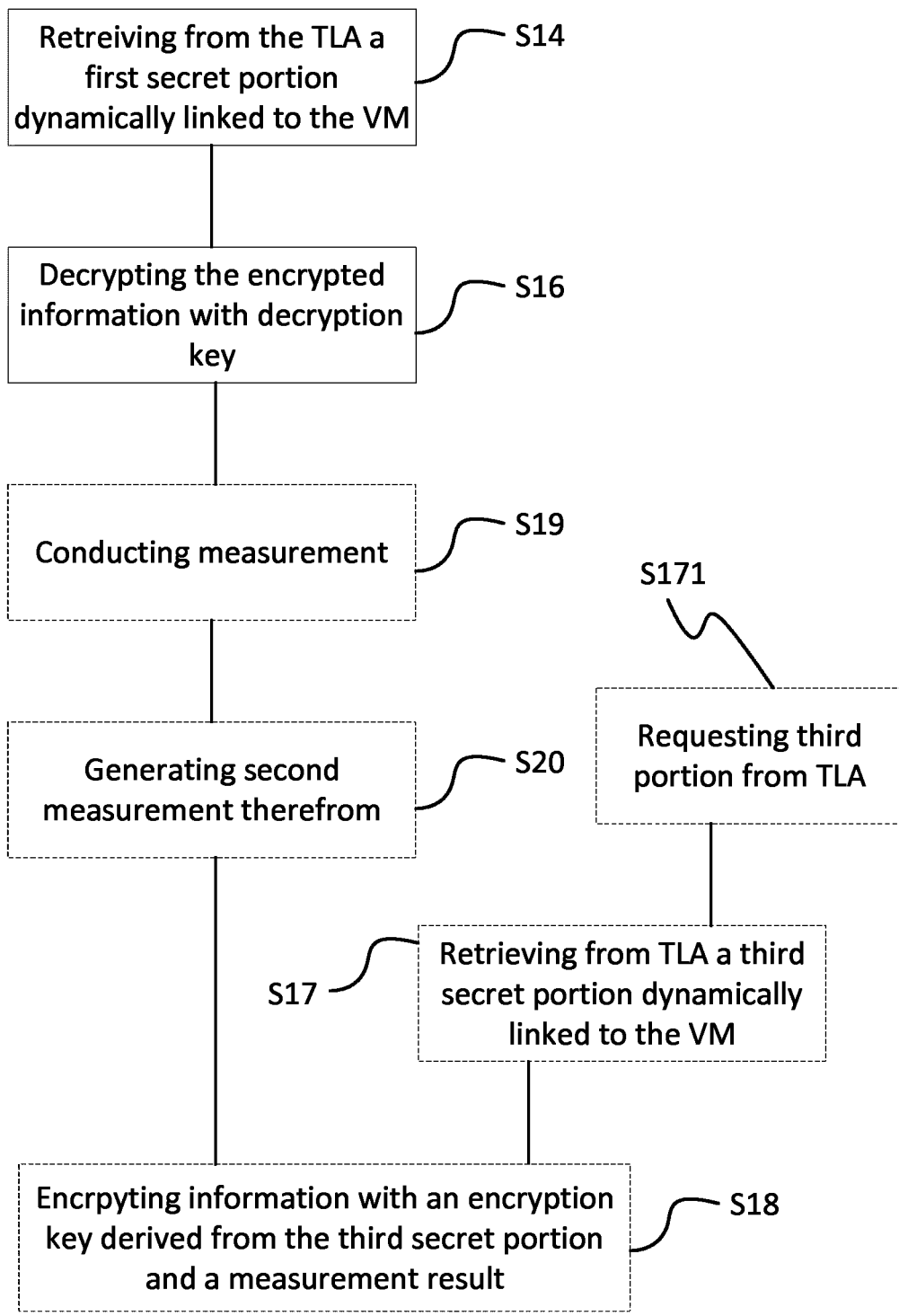
FIG. 6 shows a further embodiment of a method illustrating several aspects of the present disclosure.

In an alternative solution shown in FIG. 6, the third secret portion is obtained after being triggered by a respective shutdown request. The method performs the steps S14 and S16 as previously described. The virtualization platform executes the VM. At some time later, a shutdown, suspense, migration or any other event is triggered which ultimately provides an image of the VM. Consequently, the vTPM is informed about the event by the virtualization platform or even the VM itself. In response thereto in Step S19 and S20, the vTPM conducts a measurement of the VM, or portions thereof similar as described above and generates the measurement results therefrom. In parallel or subsequently or preceding to these tasks, the vTPM requests from the TLA the third secret portion in step S171. In Step S17, the vTPM retrieves from the TLA the third secret portion, that is dynamic and linked to the VM. Together with the second measurement result, the vTPM generates an encryption key and encrypts the vTPMContext associated with the vTPM and the respective VM.

Figure 7:
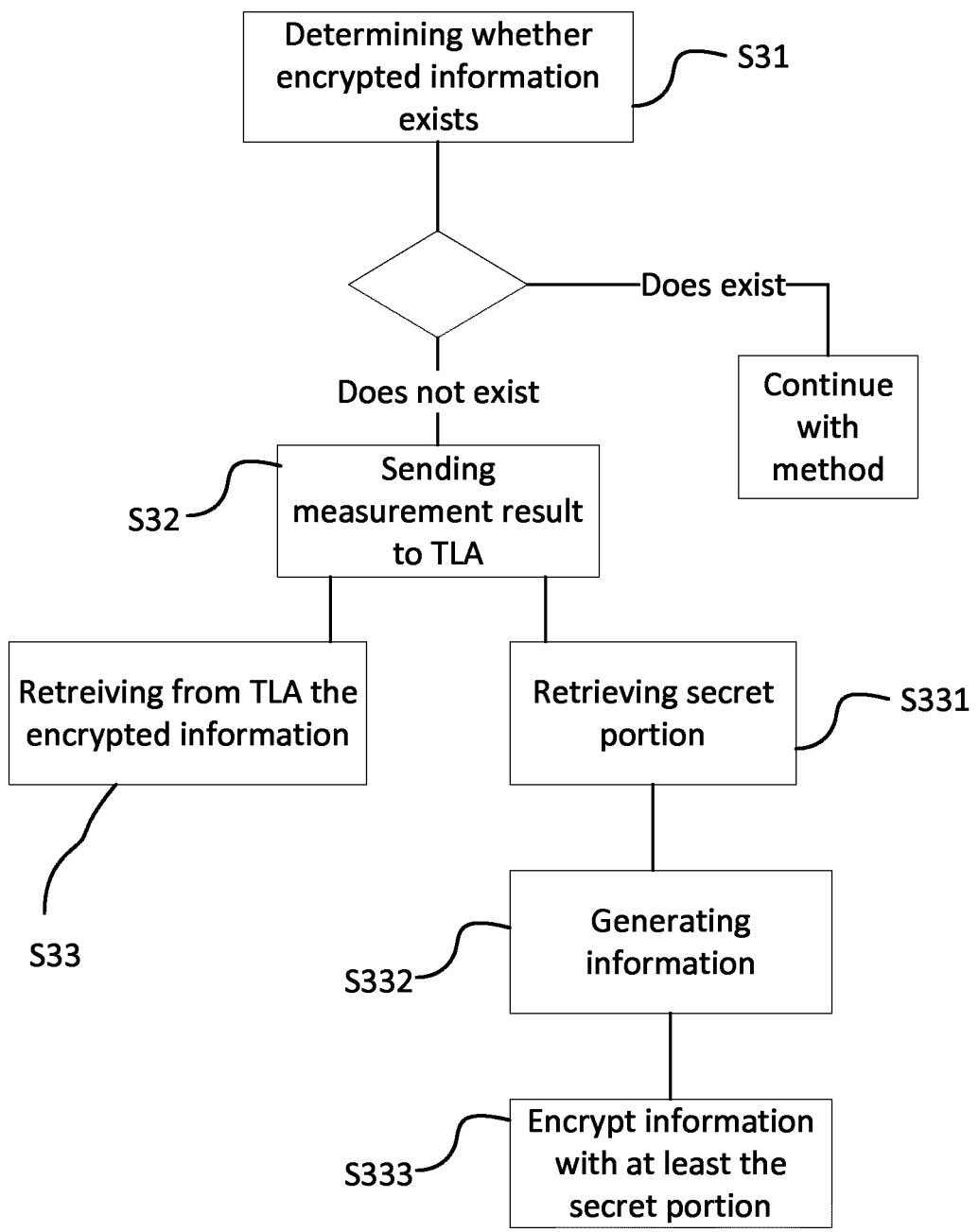
FIG. 7 shows some aspects related to an initial launch of a VM.

The previous embodiments illustrate several aspects, with the pre-requisite that encrypted vTPMContext already exists. While this is suitable for VM, which are either already running or restored or restarted form a previous session, an initial launch of a VM does not have any encrypted information and/or vTPMContext. As a result, the vTPM must be informed by the virtualization platform about the initial launch, such it can incorporate the newly launched VM into its version control. FIG. 7 illustrates an embodiment incorporating aspects related to an initial launch of a VM.

In step S31, the vTPM receives information from the virtualization platform about the soon-to-be launch of a VM. Such information may include identifier of the VM to be launched and other suitable information enabling the vTPM to determine, whether encrypted information, that is vTPMContext associated with the VM to be launched exists. If such encrypted information is available (either obtained by the vTPM itself or provided by the virtualization platform), the method continues as previously described. In case the encrypted information is not found, the vTPM assumes, the VM to be launched or started has not previously launched or is not yet included in the version control mechanism provided by the vTPM.

As a consequence thereof, the vTPM sends in step S32 a respective measurement result $VmDigest_{start}$ of the VM to be launched to the TLA. The TLA uses this information to provide a respective feedback. In a first alternative, the TLA generates vTPMContext using the measurement results and other information related to the vTPM and subsequently encrypts the vTPMContext using the measurement result $VmDigest_{start}$ and a secret generated by the TLA. The encrypted information encvTPMContext is then sent back to the vTPM as shown in step S33. In a second alternative, the TLA generates a secret portion out of the measurement results and returns the secret portion optionally together with an identifier associated with the VM to be launched to the vTPM. The vTPM receives in step S331 the secret portion and optionally the identifier and obtains or generates in step S332 all necessary information vTPMContext. The secret obtained in step S331 is used in step S333 to encrypt the generated information vTPMContext. In addition, the encryption may use further parameter, for instance the measurement results, salt, IV and the like. Since the vTPM Context is just manufactured, and the initial encryption simulates a stop procedure, then the $VmDigest_{start}$ in this context can be regarded also as the (virtually previous) VmDigest end value, so that after the new and encrypted context is stored, the further steps would then continue with the START procedure using the $VmDigest_{start}$—the same value as the (virtually previous) $VmDigest_{end}$.

This initial encryption, either by the vTPM itself or by the TLA initiates the version control for the initial launch of the VM. The method continues then as described previously, by decrypting the encrypted information. The encryption of the information prior to the initial launch enables the vTPM to perform a trusted initial boot for the VM and particularly sets the VM in a trusted state from the beginning.

Figure 8:
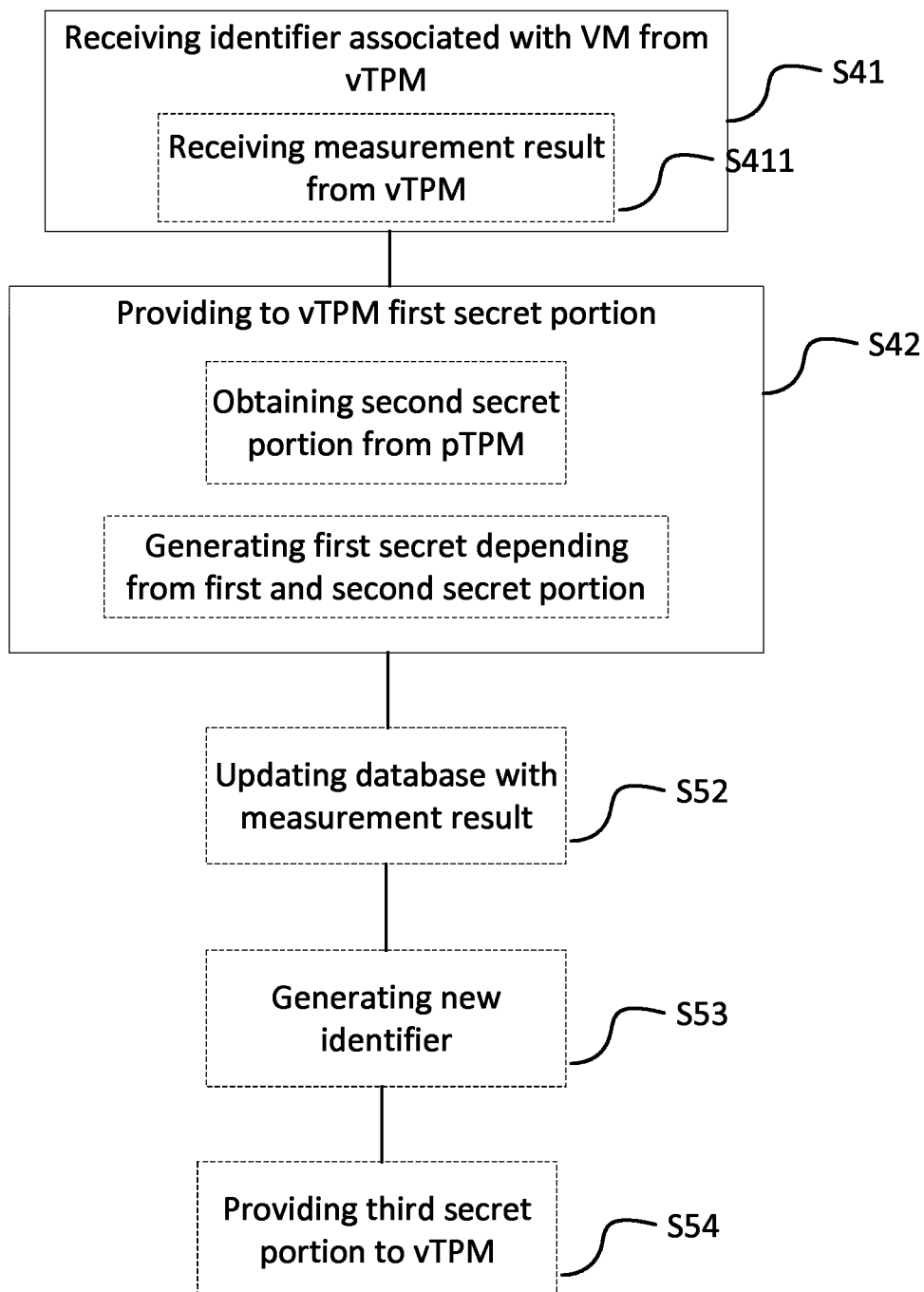
FIG. 8 illustrates an embodiment of a method performed in a trusted launch authority, TLA.

FIG. 8 shows an embodiment of a method performed in a trusted launch authority, TLA for supervising an execution of a virtual machine, VM on an execution platform. In a first step S41 an identifier associated with a VM to be executed is received from the vTPM. Optionally to the reception of the identifier, a measurement results $VmDigest_{start}$ may be received from the vTPM in step S411. The TLA then obtains in step S42 a first secret portion $SlaKey_{start}$ and provides the first secret portion $SlaKey_{start}$ to the vTPM. The first secret portion is derived from the previously obtained identifier and dynamically linked to the VM to be executed. It can further be dependent on the measurement results $VmDigest_{start}$ obtained in step S411. Dynamically linked in this regards refers to a version control. That is the launch or restart of the VM is controlled such that a specific version of the VM can only be launched once, but not multiple times. This prevents tampering attempts of a VM and generally increases security against data theft or manipulation.

In addition, the first secret portion $SlaKey_{start}$ may be dependent from a second secret portion. The second secret portion is obtained in step S421 from the pTPM, the platform on which the vTPM is executed on, or any other trusted pTPM. The first secret portion is generated using the second secret portion. By doing so, it is possible to bind the information to be encrypted and ultimately the execution of the VM to a physical trusted platform module.

Optionally, the TLA updates its database with the measurement results in step S52 to maintain the version control and keep it in order. At some point in time, the TLA receives the information about the VM to be stopped, hibernated or shutdown. In step S53, the TLA generates a new identifier DB.Salt with a random content and provides a third secret portion SlaKey the end vTPM. The third secret portion $SlaKey_{end}$ is dependent on the new identifier DB.Salt and some other parameters, for instance a property of the VM to be stopped or hibernated, a measurement result of said VM and a secret SlaVmSec associated with said VM and the TLA. In some embodiments, the third secret portion is provided to the vTPM, in Step S54. The vTPM can use the third secret portion SlaKey end to encrypt the vTPMContext as previously disclosed. Generation of the new identifier DB.Salt and the third secret portion can be performed upon explicit request by the vTPM or subsequently to step S42 as illustrated herein.

Figure 9:
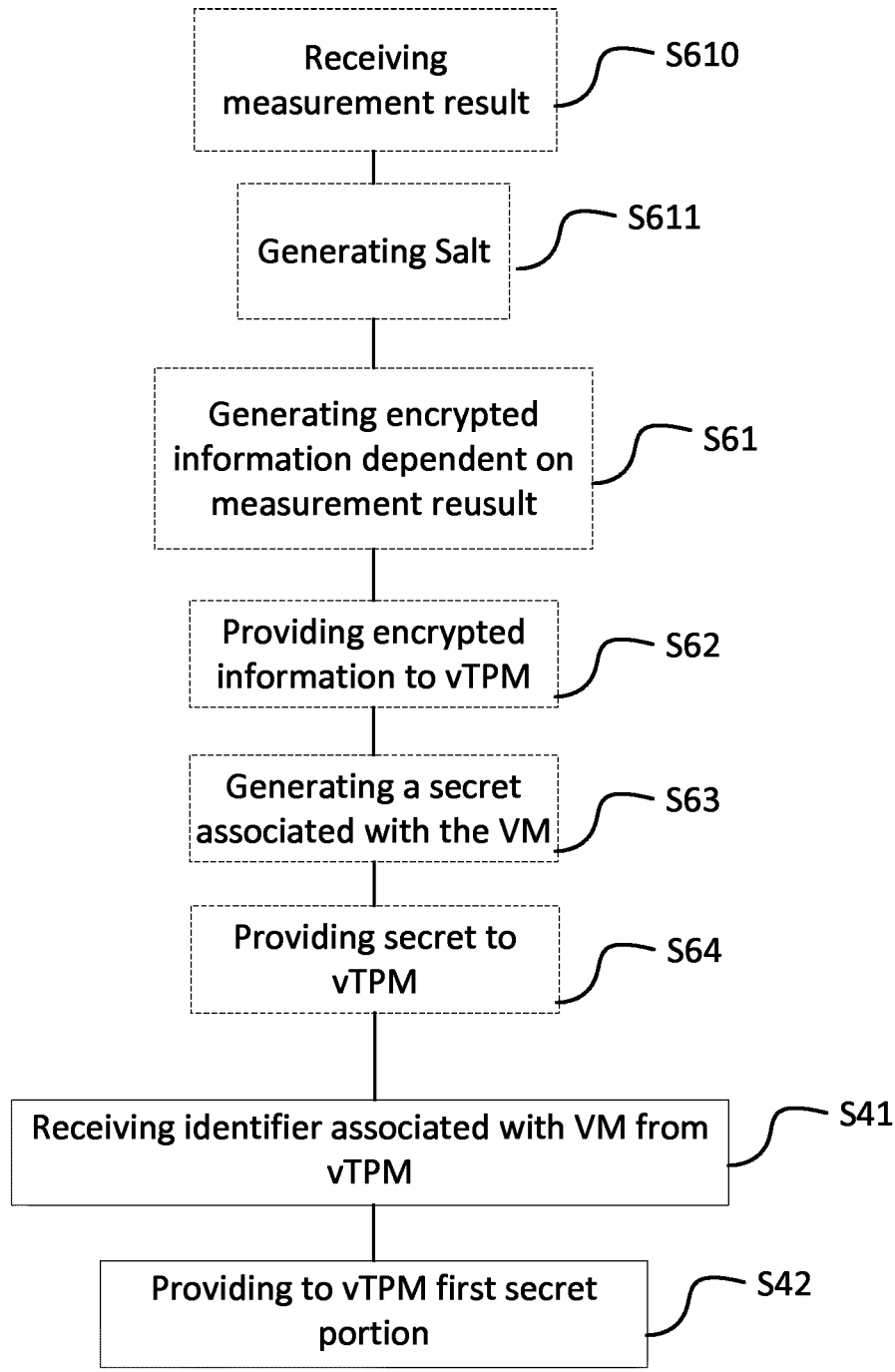
FIG. 9 shows some aspects of a method performed by the TLA.

FIG. 9 illustrates further aspects of the method performed by the TLA. In this embodiment focus is set to the initial launch of the VM. In step S610 a measurement result VmDigest is received from the vTPM, wherein the measurement result is associated with a VM. The TLA generates subsequently an identifier Salt in step S611. The identifier Salt generated in step S611 and the measurement result in step S610 is used in step S61 to generate encrypted information encvTPMContext associated with the VM in response to a request by the vTPM. Hence, the encrypted information encvTPMContext is dependant at least on a measurement result VmDigest provided by the vTPM and an identifier Salt associated with the VM. The encrypted information is then transmitted to the vTPM in step S62. Further in optional step S63, a secret VmSec associated with the VM to be executed is generated and subsequently provided in step S64 to the vTPM. The transmission or transfer of the secret in step S64 to the vTPM is performed in a secured way, and optionally in a way different from providing to the vTPM at least the first secret portion $SlaKey_{start}$. The method then continues with steps S41 and S42 as previously described.

Figure 10:
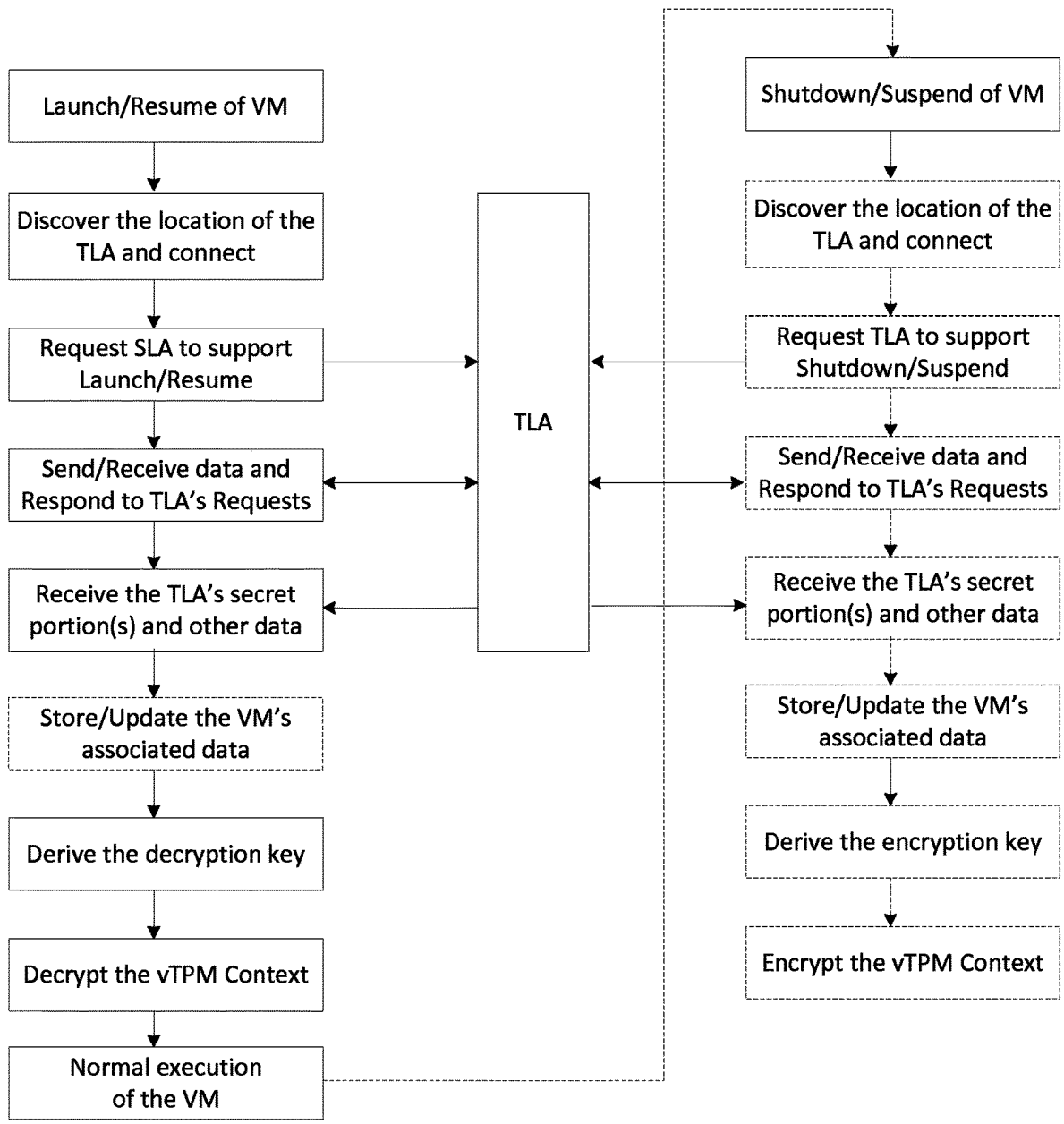
FIG. 10 shows some aspects concerning the flow of the VM's lifecycle procedures in a vTPM solution with a version control property.

FIG. 10 illustrates, once more in general terms and expression the flow of the VM's lifecycle procedures in a vTPM solution with a version control property utilizing the TLA functionality. Generally, the launch or resume of a VM is initiated by the virtualization platform that informs the vTPM about the process. If not already done, the vTPM needs to discover the location of the TLA and connect thereto. This is necessary to establish proper version control of the VM to be launched or resumed. The vTPM may also request the TLA to support the launch and resume procedure. This may be needed in case wherein the TLA requires preparation of certain information or tasks. Those tasks may for instance include the establishment of a secure communication channel, preparation of platform configuration registers or attestation form the host of the vTPM. Subsequently, the vTPM and the TLA communication with each other and exchange data including measurements results and secret as described in one or more of the disclosed methods. Ultimately and shown herein the vTPM receives from the TLA the required secret portions to facilitate the launch procedure.

Optionally, the vTPM may also store and update the VTPMContext, the identifier Salt and other data associated with the VM to be launched or resumed. As previously described the decryption key of the encrypted information is derived and the encvTPMContext is decrypted. In this general flow, the situation similar to the embodiment of FIG. 7 may be included. For instance during the communication between the vTPM and the TLA, data can be exchanged indicating an initial launch of the VM, such the TLA provides the necessary information e.g. the encrypted information encvTPMContext for the initial launch of the VM. Consequently, the vTPM would store those encrypted information as it is associated with the initial launch of the VM and then continue with decryption of the encvTPMContext.

When at a later stage the VM is to be shutdown or suspended, the vTPM is informed about such shutdown and/or suspension. It subsequently establishes a connection with the TLA (if not done before). This newly discovery process, both for the launch and the shutdown process as illustrated allows the TLA to be moved to another address or location and still provide version control according to the proposed principle. After connecting to the TLA and its request to support the shutdown or suspend procedure, the vTPM initiates communication with the TLA and sends the required data as disclosed in one or more of the previous embodiments. The information provided by the TLA is optionally used to update or stored the data associated with the VM. Subsequently, the secret provided by the TLA is used to generate and encryption key, which is used to encrypt the information associated with the VM. The key itself is version controlled as is utilizes the secret provided by the TLA.

Figure 11:
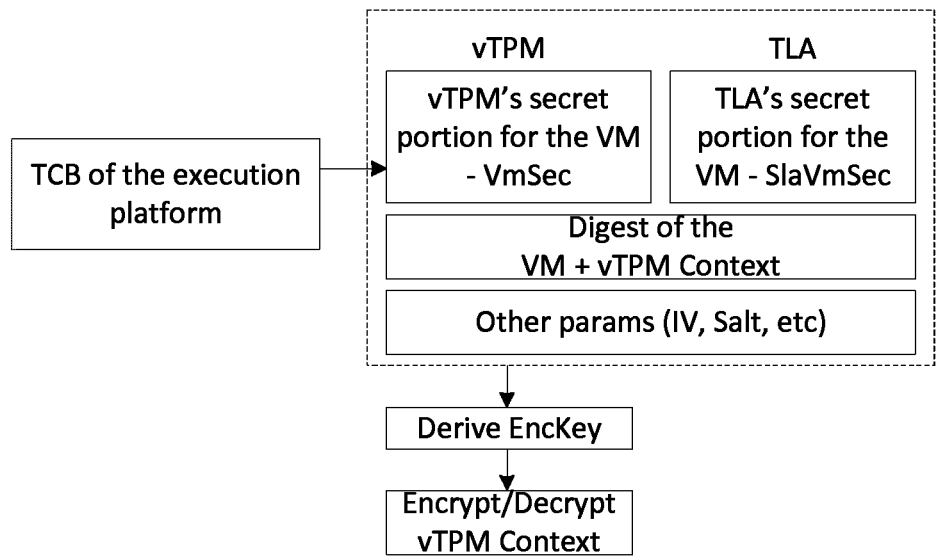
FIG. 11 illustrates some aspects of a vTPM solution with the property of the version control.

FIG. 11 shows from a parameter perspective the general approach to implement a vTPM solution with the property of the version control, where the encryption key EncKey is derived from two secret portions for the VM.

In the present example, the information vTPMContext is associated with a secret value VmSec (that can be a constant value or dynamically changing), whose purpose is to bind the possibility to decrypt the vTPMContext to the TCB of the execution platform. This binding can be done as, for example, by using VmSec as (one of) the input secret material to derive the encryption key for the vTPMContext;

Further, VmSec is bound to the TCB of the execution platform, so that the vTPM can retrieve the VmSec only if the system is in a trusted state. That binding can be done by sealing the VmSec to the PCRs of the physical TPM on the execution platform, or by encrypting the value by another key that is in turn bound to the TCB.

The TLA then controls the launch/resume procedure by holding another secret portion SlaVmSec, and providing a dynamic secret portion SlaKey derived therefrom to the vTPM Device. Combining the two secrets VmSec and SlaKey would derive the decryption key DecKey, given the current measurements of the VM, VmDigest. DecKey=DecKey_h(VmSec, SlaKey, VmDigest$_{start}$, . . . ).

The function DecKey_h( ) may be a hash function, for example, SHA1, SHA2, SHA3, or be a more complicated function, as we will show it in the following example of the scheme. Other parameters of the function DecKey_h( ) can include Salt and IV. The encryption key EncKey for encryption a vTPMContext upon shutdown can be derived using the same function DecKey_h( ) but with different parameters or values, for example:
EncKey=DecKey_h(VmSec, SlaKey, VmDigest$_{end}$, . . . ).

The parameters Salt and IV can also change when generating a new encryption key. The purpose to use VmDigest in the derivation function of the encryption key EncKey is to prevent the situation when the SlaKey provided by the TLA is just stored somewhere and then reused at another time.

Thus, the value of SlaKey should be dynamic and be different for different launches, i.e., it should at least depend on the measurements VmDigest. The encryption and decryption keys are changing from one launch to another, and also depend on the secret portion SlaKey provided by the TLA.

To avoid the requirement that the vTPM must connect to the TLA during the shutdown/suspend procedures of the VM, the TLA may include a time-forward secret portions to the vTPM Device during the launch/resume procedure, so that the other set of secrets will be used to derive the closing EncKey—a new encryption key for the shutdown/suspend procedure.

Figure 12:
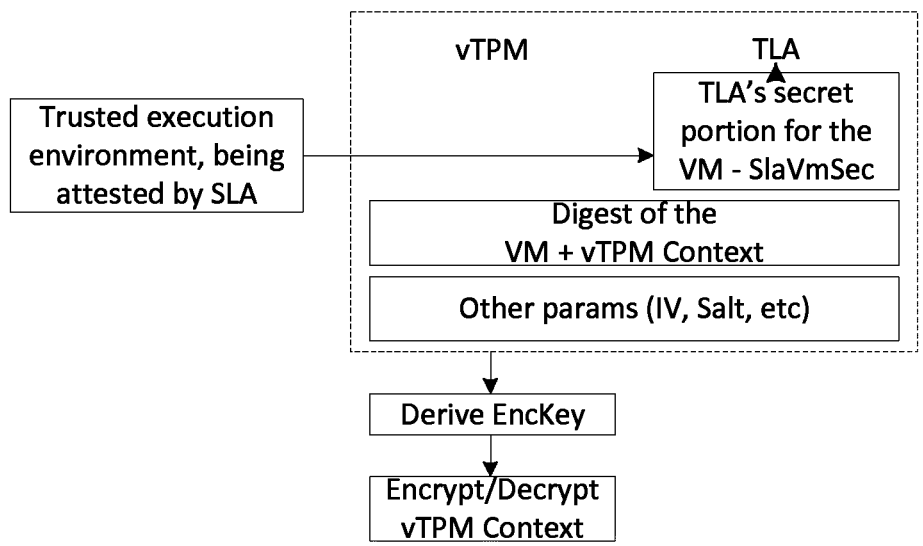
FIG. 12 shows some further aspects of a vTPM solution with the property of the version control.

FIG. 12 shows the general approach from a parameter perspective to implement a vTPM solution with the property of the version control, where the encryption key is derived from a single TLA's secret portion for the VM. In this security scenario the encryption key EncKey is derived only from the TLA's dynamic secret material, e.g.:

EncKey = DecKey_h(SlaKey, VmDigest$_{end}$, . . . )
DecKey = DecKey_h(SlaKey, VmDigest$_{start}$ . . . )

As before the secret SlaKey is derived from the TLA's secret portion SlaVMSec. As a result of the generation of the encryption or decryption key, the connection to the TCB of the execution platform does not need to be continuously. However, the TLA may perform a remote attestation of the execution platform before the SlaKey is transmitted to the vTPM Device.

FIG. 13 illustrates an implementation example for a communication between a vTPM and the TLA. In the implementation example, the case will be illustrated where the decryption and/or the encryption key is derived from two secret portions—one available to the vTPM and another available to the TLA. The solution requires the vTPM to connect the TLA on launch/resume procedures, but does not require a connection or a communication during the shutdown/suspend procedures. The vTPM must also contact the TLA for the purpose of a vTPM manufacturing that is preparation for the initial launch of a VM. The encryption of the vTPMContext can be done with a symmetric cipher, such as, e.g., AES-128/192/256, and in a selected mode of operation such as, e.g., CBC/OFB/AEAD/etc.

For the sake of notation, the dynamic parameters that change in a single cycle between the launch/resume and the shutdown/suspend will be denote as Start in the beginning of the launch/resume procedure, and End in the shutdown/suspend procedure.

The TLA comprises a database DB. This database should contain information that links a specific VM to a secret value and data which is needed for handling the vTPMContext. For example the DB may contain one or more records of the following structure:
DB={VmDigest; SlaVmSec; Salt; . . . }.

The vTPMContext (or the VM) in the beginning of the launch/resume procedure is associated with the following parameters:
  A secret parameter: VmSec. The value of this parameter is stored securely and can be bound to the TCB of the execution platform;
  Public parameters: Salt, IV—the set of public values depends on a chosen security scenario and may vary, but for the current exampled implementation it is Salt and IV.

FIG. 13 in this regard illustrates the communication and handling of these different parameters in accordance with one or more of the previously described embodiments. The vTPM at some point measures the VM, optionally including the vTPMContext or parts thereof and stores the measurement result VMDigest$_{start}$ using hash function h$_0$. For a launch or resume procedure, it also retrieves the secret value VmSec, public Salt and IV, associated to the current vTPM-Context and/or the VM to be launched. The parameters Salt and VMDigest$_{start}$ are then send to the TLA with a request to support the version controlled launch/resume procedure.

After receiving the respective data, the TLA performs several steps. First it searches its own database DB for the record associated with the VM to be launched. For this purpose, the TLA utilizes the parameter Salt, which consequently acts as an identifier for the VM associated with it. If the record DB.Salt=Salt exists, the TLA continues, otherwise it returns an error or initiates a manufacturing sequence. The TLA then continues to compute certain values based on the data received. In a first step it computes the vector x based on the function $h_1$. This function may be a hash function and utilizes several parameters stored in its database and associated with DB.Salt, for instance:
x=h1(DB.SlaVmSec, DB.Salt, DB.VmDigest, ... );

The vector x is subsequently used as input for a second function $h_2$, computing the secret portion $SlaKey_{start}$ used for generating the decryption key:
$SlaKey_{start}$=h2(x, $VmDigest_{start}$, ... );

The identifier value DB.Salt is updated with a new random value and measurement result parameter in the database of the TLA updated accordingly:
DB.VmDigest=$VmDigest_{start}$;

Then subsequently, the TLA computes also the third secret portion used to generate the encryption key for a future use by the vTPM in response to a shutdown procedure, thus avoiding vTPM to later connect TLA when the STOP procedure is initiated:
$SlaKey_{end}$=h1(DB.SlaVmSec, DB.Salt, DB.VmDigest, ... );

This is now performed in one single step with the function $h_1$ and also with the updated parameters in the database that is the new salt value and the new measurement result. The update for the identifier with a new random and the measurement result achieves the version control functionality. The TLA responds to the vTPM in this example with three different values, namely the new Value for the Salt parameter stored in DB.Salt, and the first and third secret portions, $SlaKey_{start}$, $SlaKey_{end}$, respectively.

Upon reception of this data, the vTPM performs an update of its Salt value with the received DB.Salt value. This new identifier is used for the next launch or resume procedure. It then computes the decryption key $DecKey_{start}$ for the launch procedure using a new hash function $h_3$ with at least the first secret portion $SlaKey_{start}$ and its own secret VmSec as input parameters:
$DecKey_{start}$=h3(VmSec, $SlaKey_{start}$, ... )

The encrypted information encvTPMContext is decrypted with the above computed decryption key and an associated IV.

For a shutdown or a suspend procedure, the vTPM does not need to contact the TLA anymore, as it already received the third secret portion $SlaKey_{end}$. Upon suspension the vTPM generates a new random value for the initialisation Vector IV. It then performs a measurement of the VM, the vTPMContext, or parts thereof utilizing the same function $h_0$ as for the initial measurement. In a subsequent step the encryption key $EncKey_{stop}$ is calculated using function $h_3$ and $h_2$ as well as the first secret portion VmSec and the third secret portion provided by the TLA. Finally, the vTPMContext is encrypted with the newly derived encryption key and the updated initialisation vector IV.

In the above, the functions $h_i()$ are hash functions such as one of or different: SHA1, SHA2, SHA3, etc. It should be hard to compute a valid input given the output of any of the functions $h_i()$. Also, it should be hard to find two inputs that give a matching result.

$h_0()$ is used to compute the current digest of the VM, including the vTPMContext. This computation may be done by the vTPM or/and by the virtualization platform. The addition of 0 or 1 depending on the cycle type (shutdown/launch, or suspend/resume) prevents the situation when the saved context at shutdown is re-initialized on resume.

$h_1()$ together with a random Salt protects the TLA's secret portion SlaVmSec that is also associated with the vTPM Context. The Salt is generated by the TLA and the binding of the SlaVmSec with the VM's digest and the salt guarantees that it is only the right version and a single copy of the VM that can be launched at any time. $h_2()$ is an intermediate function that binds the transition of the VM's digest from the old state to the new state. Function $h_3()$ binds the TLA's portion of the secret with the VM's portion of the secret.

In the present example, the vTPM does not have to connect to the TLA during the shutdown/suspend procedure at time t. This is because of the TLA's secret portion at that time t depends on the VM digests in times (t-1) and (t-2), and it can be computed in advance when the VM was launched/resumed already in time from the saved state in time (t-1).

FIG. 14 illustrates an exemplary embodiment a system having a network node with host or execution platform and an authority node. Both nodes can be separated and/or part of a larger network and are connected via a wired or wireless communication link or a combination thereof. The can be located separately. For instance the authority node can be placed in a secured area with limited physical access, while the network node can be part of a larger cloud provider, offering various cloud services to customers. Such cloud services can include the provision of trusted virtual machines.

Network node 100 comprises a memory 105, one or more processors 101 having access thereto and a physical trusted platform module pTPM 102. The pTPM is connected to the memory and to the one or more processors via a special interface TIS. In one or more embodiments, the memory may contain a virtualization platform 103, comprising a virtual TPM 106. In accordance with the present disclosure, the one or more processors are configured to execute the virtualization platform 103, the vTPM 106 and more particular a virtual machine, VM 108 on the node. The virtual TPM, vTPM 106 communicates with the VM via a virtual interface vTIS. It may further be configured to communicate with the pTPM via interface TIS.

A second node 200 acts as authorization node and can comprise similar elements, for instance memory 203, TLA 206 and processors 201. Authorization node can have a network link 300 to the network node 100. Via such link authorization node can provide attestation for network node 100 using the pTPM 102.

The one or more processors 101 of network node are configured to obtain encrypted information encvTPMContext and a first identifier Salt, both associated with a virtual machine, VM to be executed. The encrypted information and the identifier can be obtained from a storage device or via a network link from some other location. The one or more processors are then configured to retrieve, using the identifier, from TLA 206 at least a first secret portion $SlaKey_{start}$, the first secret portion $SlaKey_{start}$ being dynamic and linked to the VM and dependant on at least a property of the VM. The one or more processors 101 are also configured to decrypt the obtained encrypted information encvTPMContext with a decryption key $EncKey_{start}$ derived from at least the first secret portion $SlaKey_{start}$ and a first measurement result $VmDigest_{start}$ of at least the VM.

In one or more embodiments, the one or more processors 101 are configured to obtain a second secret portion, the second secret portion associated with the physical trusted platform module 102, wherein the decryption key $EncKey_{start}$ is dependent on the second portion. Alternatively, the one or more processors are configured to obtain a second secret portion from TLA 206 via network 300.

As stated before the first secret portion is dependent inter alia from the first measurement result $VmDigest_{start}$. Such measurement can be conducted by the one or more processors. The measurement performed by the processors can include hashing the VM, parts thereof, the vTPMContext, a combination thereof or other data unique to the VM.

Network communication between network node 100 and authorization node 300 utilizes network link 300. The one or more processors are configured to provide the TLA with the first measurement result VmDigest$_{start}$ to retrieve the first secret portion SlaKey$_{start}$, wherein the first secret portion SlaKey$_{start}$ is dependent on the first measurement result VmDigest$_{start}$. As previously discussed, the TLA may also provide a third secret portion SlaKey$_{end}$, the third secret portion being dynamic and linked to the VM and dependant on at least one of a property of the VM, the first measurement result VmDigest$_{start}$, and a second identifier DB.Salt generated by the TLA. The one or more processors 100 are configured to request such portion and to receive the data provided by the TLA over network 300.

In another aspect, the one or more processors 100 are configured to encrypt information vTPMContext in response to a suspension or shutdown of the VM with an encryption key EncKey$_{end}$ derived from at least the third secret portion SlaKey$_{end}$ and a second measurement result VmDigest$_{end}$ of at least the VM. Such second measurement is conducted by the processors based on the VM to be suspended or shutdown, parts thereof, other unique properties of the VM and/or information vTPMContext associated with the VM to be suspended or shutdown.

Another aspect is related to manufacturing of a version controlled execution of a VM. The one or more processors may be configured to determine whether encrypted information encvTPMContext exists. If such context does not exist, processors 101 may send measurement result VmDigest$_{start}$ to the TLA; and retrieve from the TLA at least the encrypted information encvTPMContext and the identifier Salt associated with the VM to be executed.

Alternatively, the one or more processors 101 are configure to retrieve S33 from the TLA a secret portion and the identifier associated with the VM to be executed and in response thereto generate the information vTPMContext. Subsequently, the one or more processors 101 may encrypt the information vTPMContext to obtain the encrypted information encvTPMContext using at least the secret portion from the TLA.

The one or more processors 201 at the authorization node are configured to execute the TLA and are further configured to receive from a virtual trusted platform module, vTPM on the execution platform on node 100 an identifier associated with a VM to be executed. The one or more processor 201 are configured to provide to the vTPM, at least a first secret portion SlaKey$_{start}$ of a secret in response to the identifier, the first secret portion SlaKey$_{start}$ being dynamic and linked to the VM to be executed and dependant on at least a property of the VM.

The one or more processors 201 may also be configured to receive from the vTPM, a measurement result VmDigest$_{start}$ associated with the VM to be executed, wherein the first secret portion SlaKey$_{start}$ is dependent on the measurement result VmDigest$_{start}$; and to update a database of the TLA with the measurement result VmDigest$_{start}$. The one or more processors may also perform other tasks. For instance the one or more processors 201 can be configured to obtain a second portion of the secret from a physical trusted platform module on the execution platform and/or to generate the at least first secret portion (SlaKey$_{start}$) of a secret dependant on the second portion. The one or more processors can further be configured to generate a secret VmSec associated with the VM to be executed.

In the exemplary embodiment network link 300 is illustrated. However communication between the vTPM on node 100 and TLA on node 200 can vary and use different channels. For example, the one or more processors 201 can be configured to provide the secret to the vTPM in a way different from providing to the vTPM at least the first secret portion SlaKey$_{start}$.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated"

The invention claimed is:

1. A network node comprising:
a memory;
a physical trusted platform module; and
one or more processors configured to access the memory and to execute a virtual machine (VM) on the network node, the one or more processors configured to:
obtain encrypted information and a first identifier, wherein both the encrypted information and the first identifier are associated with a virtual machine (VM) to be executed;
retrieve, using at least the first identifier, from a trusted launch authority (TLA), at least a first secret portion of a secret, wherein the first secret portion is dynamic, linked to the VM, and dependent on at least a property of the VM; and
decrypt the encrypted information with a decryption key derived from at least the first secret portion and a first measurement result of at least the VM.

2. The network node according to claim 1, wherein the one or more processors are configured to execute a virtual trusted platform module.

3. The network node according to claim 1, wherein the one or more processors are configured to obtain a second secret portion of the secret, the second secret portion associated with the physical trusted platform module, wherein the decryption key is dependent on the second secret portion.

4. The network node according to claim 1, wherein the one or more processors are configured to obtain a second secret portion of the secret from the TLA via a network, wherein the decryption key is dependent on the second secret portion.

5. The network node according to claim 1, wherein the one or more processors are configured to:
conduct a measurement of at least one of:
the VM to be executed; or
the encrypted information associated with the VM to be executed; and
generate the first measurement result from the conducted measurement.

6. The network node according to claim 5, wherein to conduct the measurement comprises hashing.

7. The network node according to claim 1, wherein the one or more processors are configured to:
provide the TLA with the first measurement result to retrieve the first secret portion, wherein the first secret portion is dependent on at least on of:
the first measurement result;

another measurement result stored by the TLA in a database during previous execution of the VM, associated with the first identifier;
the first identifier; or
a first identifier previously used and stored by the TLA.

8. The network node according to claim 1, wherein the one or more processors are configured to:
retrieve from the TLA at least a third secret portion of the secret, the third secret portion dynamically linked to the VM and dependent on at least one of:
a property of the VM;
the first measurement result; or
a second identifier generated by the TLA.

9. The network node according to claim 8, wherein the one or more processors are configured to:
encrypt information in response to a suspension or shutdown of the VM with an encryption key derived from at least the third secret portion and a second measurement result of at least the VM.

10. The network node according to claim 9, wherein the one or more processors are configured to:
conduct a measurement of at least one of:
the VM to be suspended or shutdown;
part of the VM to be suspended or shutdown;
properties of the VM to be suspended or shutdown; or
information associated with the VM to be suspended or shutdown; and
generate the measurement result from the conducted measurement.

11. The network node according to claim 1, wherein the first secret portion is dependent on at least one of:
a measurement result of the VM;
a sequential instance of the VM;
a start or stop cycle number of the VM;
a time stamp at the occurrence of a status change of the VM;
information about previous executions of the VM; or
time information associated with the VM and/or an execution platform and/or a virtual trusted platform module executed by the one or more processors.

12. The network node of claim 11, wherein the encrypted information comprises a virtual trusted platform module (vTPM) context for a vTPM associated with the VM to be executed.

13. The network node of claim 12, wherein the first measurement result comprises a hash of at least a portion of an image of the VM.

14. The network node according to claim 1, wherein the one or more processors are configured to:
determine whether encrypted information exists;
if encrypted information does not exist, send measurement result to the TLA; and
retrieve from the TLA at least the encrypted information and the identifier associated with the VM to be executed.

15. The network node according to claim 9, wherein the one or more processors are configured to:
determine whether encrypted information exists;
if encrypted information does not exist, send measurement result to the TLA;
retrieve from the TLA a secret portion and a second identifier associated with the VM to be executed;
generate the information; and
encrypt the information to obtain the encrypted information using at least the secret portion from the TLA.

16. An authorization node comprising:
a memory; and
one or more processors configured to access the memory and configured to execute a trusted launch Authority (TLA) for supervising at least partly an execution of a virtual machine (VM) on an execution platform, the one or more processors configured to:
receive, from a virtual trusted platform module (vTPM) on the execution platform, an identifier associated with a VM to be executed;
provide, to the vTPM, at least a first secret portion of a secret in response to the identifier, the first secret portion dynamically linked to the VM to be executed and dependent on at least a property of the VM.

17. The authorization node according to claim 16, the one or more processors configured to:
receive from the vTPM, a measurement result associated with the VM to be executed, wherein the first secret portion is dependent on at least one of the measurement result;
another measurement result stored by the TLA in a database during previous execution of the VM, associated with the first identifier;
the first identifier; or
a first identifier previously used and stored by the TLA; and
update a database of the TLA with the measurement result.

18. The authorization node according to claim 16, wherein the one or more processors are configured to at least one of:
obtain a second portion of the secret from a physical trusted platform module on the execution platform; and
generate the at least first secret portion of the secret dependent on the second portion;
generating a secret associated with the VM to be executed; and
provide the secret to the vTPM in a way different from providing to the vTPM, at least the first secret portion.

19. The authorization node according to claim 16, wherein the one or more processors are configured to:
generate randomly a new identifier;
provide a third secret portion of the secret, the third secret portion dependent on the new identifier and at least one of:
a property of the VM;
the measurement result;
a second measurement result; and
a secret associated with the TLA and the VM.

20. The authorization node according to claim 16, wherein the one or more processors are configured to:
generate encrypted information associated with the VM in response to a request by the VTPM, the encrypted information dependent at least on a measurement result provided by the vTPM and an identifier associated with the VM and generated by the TLA;
provide the encrypted information to the vTPM.

21. A method performed by a virtual trusted platform module (vTPM) on an execution platform, the method comprising:
obtaining encrypted information and a first identifier, wherein both the encrypted information and the first identifier are associated with a virtual machine (VM) to be executed;
retrieving, using at least the first identifier, from a trusted launch authority (TLA), at least a first secret portion, wherein the first secret portion is dynamic, linked to the VM, and dependent on at least a property of the VM; and decrypting the encrypted information with a decryption key derived from at least the first secret portion and a first measurement result of at least the VM.

22. A method performed by a trusted launch authority (TLA) for supervising an execution of a virtual machine (VM) on an execution platform, the method comprising:

receiving a first identifier associated with a VM to be executed from a virtual trusted platform module (vTPM) on the execution platform; and providing to the vTPM, at least a first secret portion of a secret being derived from the first identifier, the first secret portion being dynamic and linked to the VM to be executed.

\* \* \* \* \*